(12) United States Patent
Hashimoto et al.

(10) Patent No.: US 9,570,718 B2
(45) Date of Patent: *Feb. 14, 2017

(54) PACKAGING MATERIAL FOR BATTERIES

(71) Applicant: DAI NIPPON PRINTING CO., LTD., Tokyo (JP)

(72) Inventors: Yohei Hashimoto, Tokyo (JP); Rikiya Yamashita, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/779,610

(22) PCT Filed: Mar. 19, 2014

(86) PCT No.: PCT/JP2014/057607
§ 371 (c)(1),
(2) Date: Sep. 24, 2015

(87) PCT Pub. No.: WO2014/156905
PCT Pub. Date: Oct. 2, 2014

(65) Prior Publication Data
US 2016/0049622 A1 Feb. 18, 2016

(30) Foreign Application Priority Data

Mar. 25, 2013 (JP) .................................. 2013-062993
Mar. 25, 2013 (JP) .................................. 2013-062994
Sep. 20, 2013 (JP) .................................. 2013-195689

(51) Int. Cl.
*H01M 2/02* (2006.01)
*B32B 15/08* (2006.01)
(Continued)

(52) U.S. Cl.
CPC .............. *H01M 2/0292* (2013.01); *B32B 7/12* (2013.01); *B32B 15/08* (2013.01); *B32B 27/08* (2013.01);
(Continued)

(58) Field of Classification Search
CPC .... H01M 2/02; H01M 2/0275; H01M 2/0277; H01M 2/0287; H01M 2/0292; B32B 7/12; B32B 15/08; B32B 27/18; B32B 27/308; B32B 27/34; B32B 27/36; B32B 27/38; B32B 27/40; B32B 27/42; B32B 2264/10; B32B 2264/108; B32B 2264/025; B32B 2264/0292; B32B 2439/00; B32B 2457/10
See application file for complete search history.

(56) References Cited

U.S. PATENT DOCUMENTS 7,048,822 B2   5/2006   Yamashita et al.
8,067,113 B2   11/2011  Yamashita et al.
(Continued)

FOREIGN PATENT DOCUMENTS

JP   H06-25388 A    2/1994
JP   H07-205387 A   8/1995
(Continued)

OTHER PUBLICATIONS

Jun. 17, 2014 International Search Report issued in International Patent Application No. PCT/JP2014/057607.
(Continued)

*Primary Examiner* — Brittany Raymond
(74) *Attorney, Agent, or Firm* — Oliff PLC

(57) ABSTRACT

A packaging material for batteries, which is formed of a laminate that sequentially includes a base layer, an adhesive layer, a barrier layer and a sealant layer in this order. By having the adhesive layer formed of a cured product of a resin composition that contains a thermosetting resin and
(Continued)

(A) a curing accelerator and an elastomer resin or (B) reactive resin beads, the adhesive layer arranged between the base layer and the barrier layer can be cured in a short time, thereby reducing the lead time. In addition, by providing the adhesive layer between the base layer and the barrier layer, the adhesion strength between the base layer and the barrier layer is increased and excellent formability can be achieved.

20 Claims, 1 Drawing Sheet

(51) Int. Cl.
*B32B 27/18* (2006.01)
*B32B 7/12* (2006.01)
*B32B 27/30* (2006.01)
*B32B 27/34* (2006.01)
*B32B 27/36* (2006.01)
*B32B 27/38* (2006.01)
*B32B 27/40* (2006.01)
*B32B 27/42* (2006.01)
*B32B 27/08* (2006.01)
*B32B 27/26* (2006.01)

(52) U.S. Cl.
CPC .............. *B32B 27/18* (2013.01); *B32B 27/26* (2013.01); *B32B 27/308* (2013.01); *B32B 27/34* (2013.01); *B32B 27/36* (2013.01); *B32B 27/38* (2013.01); *B32B 27/40* (2013.01); *B32B 27/42* (2013.01); *H01M 2/02* (2013.01); *H01M 2/0275* (2013.01); *H01M 2/0277* (2013.01); *H01M 2/0287* (2013.01); *B32B 2264/025* (2013.01); *B32B 2264/0292* (2013.01); *B32B 2264/10* (2013.01); *B32B 2264/108* (2013.01); *B32B 2307/714* (2013.01); *B32B 2439/00* (2013.01); *B32B 2457/10* (2013.01)

(56) References Cited

U.S. PATENT DOCUMENTS

| | | |
|---|---|---|
| 2010/0004356 A1 | 1/2010 | Yoshinaga et al. |
| 2010/0015451 A1 | 1/2010 | Suzuta |
| 2012/0034477 A1 | 2/2012 | Yamashita et al. |
| 2012/0135301 A1 | 5/2012 | Akita et al. |
| 2012/0258353 A1 | 10/2012 | Yamashita et al. |
| 2014/0087241 A1 | 3/2014 | Kuramoto et al. |

FOREIGN PATENT DOCUMENTS

| | | |
|---|---|---|
| JP | H09-39161 A | 2/1997 |
| JP | H09-283876 A | 10/1997 |
| JP | 2001-202927 A | 7/2001 |
| JP | 2002-056823 A | 2/2002 |
| JP | 2003-072295 A | 3/2003 |
| JP | 2006-342238 A | 12/2006 |
| JP | 2010-086831 A | 4/2010 |
| JP | 2011-054563 A | 3/2011 |
| JP | 2011-187386 A | 9/2011 |
| WO | 2008/047700 A1 | 4/2008 |
| WO | 2008/093778 A1 | 8/2008 |
| WO | 2012/133663 A1 | 10/2012 |

OTHER PUBLICATIONS

Jul. 1, 2014 International Search Report issued in International Patent Application No. PCT/JP2014/057606.
Nov. 3, 2016 European Search Report issued in European Patent Application No. 14775806.4.
Nov. 3, 2016 European Search Report issued in European Patent Application No. 14773090.7.

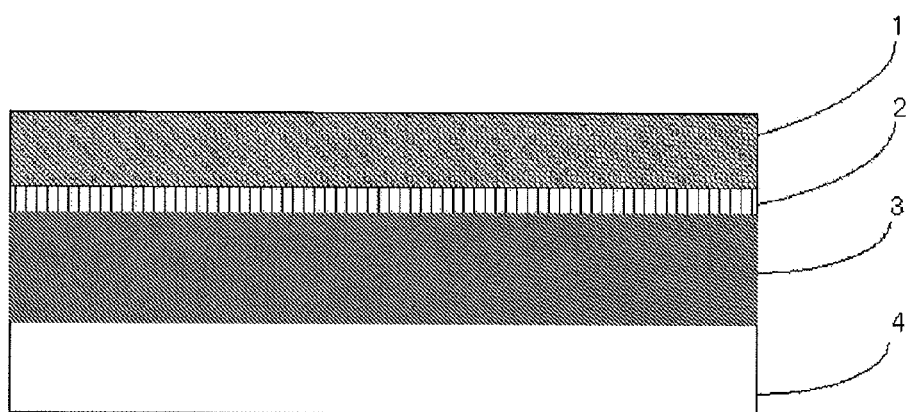

PACKAGING MATERIAL FOR BATTERIES

TECHNICAL FIELD

The present invention relates to a film-shaped battery packaging material which is capable of achieving excellent adhesion strength due to quick curing of an adhesive layer provided between a base material layer and a barrier layer, and which also has excellent moldability.

BACKGROUND ART

Various types of batteries have been developed heretofore, and in every battery, a packaging material is an essential member for sealing battery elements such as an electrode and an electrolyte. Metallic packaging materials have often been used heretofore as battery packaging materials, but in recent years, batteries have been required to be diversified in shape and to be thinned and lightened with improvement of performance of electric cars, hybrid electric cars, personal computers, cameras, mobile phones and so on. However, metallic battery packaging materials that have often been heretofore used have the disadvantage that it is difficult to keep up with diversification in shape, and there is a limit on weight reduction.

Thus, in recent years, a film-shaped laminate including a base material layer, an adhesive layer, a barrier layer and a sealant layer laminated in this order has been proposed as a battery packaging material which is easily processed into diverse shapes and which can be thinned and lightened (see, for example, Patent Document 1). The film-shaped battery packaging material is formed in such a manner that a battery element can be sealed by heat-welding the peripheral edge by heat sealing with the sealant layers facing each other.

On the other hand, in a conventional film-shaped battery packaging material, usually a base material layer and a barrier layer are bonded to each other by a dry lamination method with a two-pack type curable adhesive to laminate the base material layer, an adhesive layer and the barrier layer, and for curing the adhesive layer, it is necessary to perform aging under a high-temperature condition for several days to several weeks. Accordingly, the conventional film-shaped battery packaging material has the disadvantage that a step of curing an adhesive layer causes an increase in lead time, leading to occurrence of product defects due to exposure to a high-temperature condition and a temperature change for a long period of time.

Thus, it is earnestly desired to develop a technique which is capable of quickly curing an adhesive layer provided between a base material layer and a barrier layer in a film-shape battery packaging material, so that the lead time can be reduced, leading to improvement of production efficiency.

PRIOR ART DOCUMENT

Patent Document

Patent Document 1: Japanese Patent Laid-open Publication No. 2001-202927

SUMMARY OF THE INVENTION

Problems to be Solved by the Invention

For quickly curing an adhesive layer provided between a base material layer and a barrier layer in a film-shaped battery packaging material, it is effective to use an adhesive component having a large number of reactive groups. However, when such an adhesive component is used, the distance between reactive groups in a three-dimensional crosslinked structure of the adhesive layer decreases, so that the problem occurs that the adhesive layer is shrunk during curing, or becomes hard and hence fragile, and thus moldability required for a battery packaging material cannot be sufficiently achieved. The curing time may be reduced by increasing the curing temperature as a condition for curing the adhesive layer, but such a short-time curing condition causes the problem that adhesion between the base material layer and the barrier layer is reduced.

Thus, an object of the present invention is to provide a film-shaped battery packaging material which is capable of achieving excellent adhesion strength due to quick curing of an adhesive layer provided between a base material layer and a barrier layer, and which also has excellent moldability.

Means for Solving the Problems

The present inventors have extensively conducted studies for achieving the above-mentioned object, and resultantly found the following matter: in a battery packaging material which includes a laminate including at least a base material layer, an adhesive layer, a barrier layer and a sealant layer in this order, when the adhesive layer is formed from a cured product of a resin composition containing a thermosetting resin, a curing accelerator and an elastomer resin, the adhesive layer provided between the base material layer and the barrier layer can be quickly cured, so that the lead time can be reduced. The present inventors have also found that by providing the adhesive layer between the base material layer and the barrier layer, adhesion strength between the base material layer and the barrier layer is increased, and excellent moldability can be achieved.

The present inventors have also found the following matter: in a battery packaging material which includes a laminate including at least a base material layer, an adhesive layer, a barrier layer and a sealant layer in this order, when the adhesive layer is formed from a cured product of a resin composition containing a thermosetting resin and reactive resin beads, the moldability of the battery packaging material can be considerably improved. Further, the present inventors have found that in this case, by further incorporating a curing accelerator to the resin composition that forms the adhesive layer, the adhesive layer can be quickly cured, so that the lead time can be reduced.

Further, the present inventors have found that by incorporating a light-absorbing and heat-generating substance in at least one of the layers included in the laminate, the adhesive layer provided between the base material layer and the barrier layer can be quickly cured to achieve excellent adhesion strength, so that the lead time can be reduced.

The present invention has been completed by further conducting studies based on the above-mentioned findings.

That is, the present invention provides an invention of the aspects described below.

Item 1. A battery packaging material which includes a laminate including at least a base material layer, an adhesive layer, a barrier layer and a sealant layer in this order, wherein the adhesive layer is a cured product of a resin composition containing a thermosetting resin, and (A) a curing accelerator and an elastomer resin or (B) reactive resin beads.

Item 2. The battery packaging material according to item 1, wherein the adhesive layer is a cured product of a resin composition containing (B) the reactive resin beads and a curing accelerator.

Item 3. The battery packaging material according to item 1 or 2, wherein the reactive resin beads are urethane resin beads or acrylic resin beads having a functional group.

Item 4. The battery packaging material according to any one of items 1 to 3, wherein the refractive index of the reactive resin beads is 1.3 to 1.8.

Item 5. The battery packaging material according to any one of items 1 to 4, wherein at least one of the layers included in the laminate contains a light-absorbing and heat-generating substance.

Item 6. The battery packaging material according to any one of items 1 to 5, wherein the adhesive layer contains a light-absorbing and heat-generating substance.

Item 7. The battery packaging material according to item 6, wherein the light-absorbing and heat-generating substance is at least one selected from the group consisting of a metal powder, an inorganic pigment, carbon and an organic dye.

Item 8. The battery packaging material according to item 6 or 7, wherein the battery packaging material includes a third adhesive layer, an insulating layer and a coating layer in this order from the base material layer side on a side of the base material layer opposite to the adhesive layer, and at least one layer selected from the group consisting of the coating layer, the insulating layer, the third adhesive layer, the base material layer, the adhesive layer and the sealant layer contains a light-absorbing and heat-generating substance.

Item 9. The battery packaging material according to any one of items 1 to 8, wherein the thermosetting resin is at least one selected from the group consisting of an epoxy resin, an amino resin, an acrylic resin, a urethane resin, a phenol resin, an unsaturated polyester resin and an alkyd resin.

Item 10. The battery packaging material according to any one of items 1 to 9, wherein the curing accelerator is at least one selected from the group consisting of an amidine compound, a carbodiimide compound, a ketimine compound, a hydrazine compound, a sulfonium salt, a benzothiazolium salt and a tertiary amine compound.

Item 11. The battery packaging material according to any one of items 1 to 10, wherein the barrier layer is a metal foil.

Item 12. A method for producing a battery packaging material, the method including the steps of:

bonding a base material layer and a barrier layer to each other with a resin composition interposed therebetween, the resin composition containing a thermosetting resin, and (A) a curing accelerator and an elastomer resin or (B) reactive resin beads, and performing heating, thereby curing the resin composition to obtain a laminate including the base material layer, an adhesive layer and the barrier layer in this order; and laminating a sealant layer on the barrier layer of the laminate obtained in the bonding step.

Item 13. A method for producing a battery packaging material, the method including a lamination step of laminating at least a base material layer, an adhesive layer, a barrier layer and a sealant layer in this order, wherein the method includes in the lamination step the following first step and second step:

the first step of forming a laminate including at least a base material layer, an uncured adhesive layer and a barrier layer in this order, wherein the uncured adhesive layer is a resin composition containing (A) a curing accelerator and an elastomer resin or (B) reactive resin beads, and at least one of the layers included in the laminate contains a light-absorbing and heat-generating substance; and the second step of converting the uncured adhesive layer into an adhesive layer by heating the laminate obtained in the first step while irradiating the laminate with light having a wavelength at which the light-absorbing and heat-generating substance can generate heat, thereby curing a thermosetting resin contained in the uncured adhesive layer.

Item 14. A battery, wherein a battery element including at least a positive electrode, a negative electrode and an electrolyte is stored in the battery packaging material according to any one of items 1 to 11.

Advantages of the Invention

In the battery packaging material according to the present invention, when an adhesive layer provided between a base material layer and a barrier layer is a cured product of a resin composition containing a thermosetting resin, a curing accelerator and an elastomer resin, the adhesive layer can be quickly cured without requiring aging under a high-temperature condition because the adhesive layer contains a curing accelerator. Therefore, the lead time can be reduced, and further, occurrence of product defects due to exposure to a high-temperature condition for a long period of time can be prevented. Since the adhesive layer contains a curing accelerator and an elastomer resin together with a curable resin, high adhesion strength can be imparted between the base material layer and the barrier layer, and in addition, the adhesive layer can be made to have moderate flexibility by suppressing shrinkage during curing, so that excellent moldability can be imparted to the battery packaging material.

In the battery packaging material according to the present invention, when the adhesive layer provided between the base material layer and the barrier layer is a cured product of a resin composition containing a thermosetting resin and reactive resin beads, the reactive resin beads exist while being chemically bonded to the thermosetting resin in the adhesive layer, so that the battery packaging material can be made to have excellent moldability while the adhesive strength of the adhesive layer is maintained, and thus generation of cracks, pinholes and the like can be suppressed even when the molding depth during deep drawing molding is increased. Further, when a curing accelerator is incorporated in the resin composition that forms the adhesive layer, the adhesive layer can be quickly cured without requiring aging under a high-temperature condition in the step of curing the adhesive layer, so that the lead time is reduced, and further, occurrence of product defects due to exposure to a high-temperature condition for a long period of time can be prevented.

Further, in the battery packaging material according to the present invention, when at least one of the layers in the laminate contains a light-absorbing and heat-generating substance, an even amount of heat can be added by the light-absorbing and heat-generating substance contained in at least one of the layers in the laminate, so that an adhesive layer can be formed which is heterogeneous with no variation in a cured state, and has excellent adhesion strength.

BRIEF DESCRIPTION OF THE DRAWING

FIG. 1 is a drawing showing one example of a cross-sectional structure of a battery packaging material according to the present invention.

EMBODIMENTS OF THE INVENTION

A battery packaging material according to the present invention includes a laminate including at least a base material layer, an adhesive layer, a barrier layer and a sealant layer in this order, wherein the adhesive layer is a cured product of a resin composition containing a thermosetting resin, and (A) a curing accelerator and an elastomer resin or (B) reactive resin beads. That is, the adhesive layer is a cured product of a resin composition containing a thermosetting resin and (A) a curing accelerator and an elastomer resin, or the adhesive layer is a cured product of a resin composition containing a thermosetting resin and (B) reactive resin beads. Hereinafter, the battery packaging material according to the present invention will be described in detail. Hereinafter, the case where the adhesive layer provided between the base material layer and the barrier layer is a cured product of a resin composition containing a thermosetting resin and reactive resin beads may be referred to as aspect A. The case where the adhesive layer provided between the base material layer and the barrier layer is a cured product of a resin composition containing a thermosetting resin and reactive resin beads may be referred to as aspect B. Further, the case where at least one of the layers included in the laminate contains a light-absorbing and heat-generating substance may be referred to as aspect C. In the battery packaging material according to the present invention, at least one of aspect A and aspect B should be satisfied, and the battery packaging material may have, for example, aspect A and aspect B, aspect A and aspect C, aspect B and aspect C, or all of aspects A to C.

1. Laminated Structure of Battery Packaging Material

The battery packaging material has a laminated structure which includes a laminate including at least a base material layer 1, an adhesive layer 2, a barrier layer 3 and a sealant layer 4 in this order as shown in FIG. 1. That is, the battery packaging material according to the present invention has the base material layer 1 as the outermost layer and the sealant layer 4 as the innermost layer. During construction of a battery, the sealant layers 4 situated on the peripheral edge of a battery element are brought into contact with each other, and heat-welded to hermetically seal the battery element, so that the battery element is encapsulated.

The battery packaging material according to the present invention may have a second adhesive layer 5 provided between the barrier layer 3 and the sealant layer 4 as necessary for the purpose of improving adhesion between the layers.

Further, the battery packaging material according to the present invention may have an insulating layer 6 provided at the outside of the base material layer 1 as necessary for the purpose of improving insulation quality. Further, when the insulating layer 6 is provided, a third adhesive layer 7 may be provided between the base material layer 1 and the insulating layer 6 as necessary for the purpose of improving adhesion between the layers.

In the battery packaging material according to the present invention, a coating layer 8 may be provided as the outermost layer as necessary for the purpose of imparting functionalities such as chemical resistance and slip properties. That is, the coating layer 8 is provided as necessary on the outside surface of the base material layer 1, or, when the insulating layer 6 is provided, on the outside surface of the insulating layer 6.

2. Compositions of Layers Forming Battery Packaging Material

[Base Material Layer 1]

In the battery packaging material according to the present invention, the base material layer 1 is a layer that forms the outermost layer. The material that forms the base material layer 1 is not particularly limited as long as it has insulation quality. Examples of the material that forms the base material layer 1 include polyesters, polyamides, epoxies, acrylics, fluororesins, polyurethanes, silicon resins, phenols, polyether imides, polyimides, and mixtures and copolymers thereof.

Specific examples of the polyester include polyethylene terephthalate, polybutylene terephthalate, polyethylene naphthalate, polybutylene naphthalate, polyethylene isophthalate, polycarbonate, copolymerization polyesters including ethylene terephthalate as a main repeating unit, and copolymerization polyesters including butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene (terephthalate/sodium isophthalate), polyethylene (terephthalate/phenyl-dicarboxylate) and polyethylene(terephthalate/decane dicarboxylate). Specific examples of the copolymerization polyester including butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof. A polyester has the advantage that it is excellent in electrolytic solution resistance, so that whitening etc. due to deposition of an electrolytic solution is hard to occur, and thus the polyester is suitably used as a material for formation of the base material layer 1.

Specific examples of the polyamide include aliphatic polyamides such as nylon 6, nylon 66, nylon 610, nylon 12, nylon 46, and copolymers of nylon 6 and nylon 6,6; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymetaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof. A stretched polyamide film is excellent in stretchability, can prevent occurrence of whitening due to resin breakage in the base material layer 1 during molding, and is thus suitably used as a material for formation of the base material layer 1.

The base material layer 1 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 1.

Among them, nylons and polyesters are preferred, and biaxially stretched nylons and biaxially stretched polyesters are further preferred, with biaxially stretched polyesters being especially preferred, as resin films for formation of the base material layer 1.

The base material layer 1 can also be a laminate with a resin film which is made of a different material for improving pinhole resistance, and insulation quality as a package of a battery. Specific examples include a multilayer structure in which a polyester film and a nylon film are laminated, and a multilayer structure in which a biaxially stretched polyester and a biaxially stretched nylon are laminated. When the base material layer 1 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method. When the resin films are bonded with the use of an adhesive, the composition of the adhesive to be used is not particularly limited, but resin compositions as described later in the section of [Adhesive Layer 2] are preferred for, for example, shortening the curing time to reduce the lead time, and further, improving moldability.

The friction of the base material layer 1 may be reduced for improving moldability. When the friction of the base material layer 1 is reduced, the friction coefficient of the surface thereof is not particularly limited, and it is, for example, 1.0 or less. Examples of the method for reducing the friction of the base material layer 1 include matting treatment, formation of a thin film layer of a slipping agent, and a combination thereof.

Examples of the method for performing the matting treatment include a method in which a matting agent is added to the base material layer 1 beforehand to form irregularities on the surface, a transfer method by heating or pressurization with an embossing roll, and a method in which the surface is mechanically roughened using dry or wet blasting, or a file. Examples of the matting agent include fine particles having a particle size of about 0.5 nm to 5 μm. The material of the matting agent is not particularly limited, and examples thereof include metals, metal oxides, inorganic substances and organic substances. The shape of the matting agent is not particularly limited, and examples thereof include a spherical shape, a fibrous shape, a plate shape, an amorphous shape and a balloon shape. Specific examples of the matting agent include talc, silica, graphite, kaolin, montmolliode, montmorillonite, synthetic mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, crosslinked acrylics, crosslinked styrenes, crosslinked polyethylenes, benzoguanamine, gold, aluminum, copper and nickel. These matting agents may be used alone, or may be used in combination of two or more thereof. Among these matting agents, silica, barium sulfate and titanium oxide are preferred from the viewpoint of dispersion stability, costs and so on. The surface of the matting agent may be subjected to various kinds of surface treatments such as an insulation treatment and dispersibility enhancing treatment.

The thin film layer of a slipping agent can be formed by precipitating a slipping agent on the surface of the base material layer 1 by bleeding-out to form a thin layer, or depositing a slipping agent on the base material layer 1. The slipping agent is not particularly limited, and examples thereof include fatty acid amides, metal soaps, hydrophilic silicones, acrylics grafted with silicone, epoxies grafted with silicone, polyethers grafted with silicone, polyesters grafted with silicone, block silicone acrylic copolymers, polyglycerol-modified silicones and paraffins. These slipping agents may be used alone, or may be used in combination of two or more thereof.

The thickness of the base material layer 1 is, for example, 10 to 50 μm, preferably 15 to 30 μm.

[Adhesive Layer 2]

The adhesive layer 2 is a layer that is provided between the base material layer 1 and the barrier layer 3 for bonding the base material layer 1 and the barrier layer 3 to each other, and is formed from a cured product of a resin composition containing a thermosetting resin, and (A) a curing accelerator and an elastomer resin or (B) reactive resin beads. When the adhesive layer 2 is thus formed by curing a resin composition containing (A) a curing accelerator and an elastomer resin and having a specific composition (aspect A), the adhesive layer 2 can be quickly cured without requiring aging under a high-temperature condition during production, and excellent moldability and adhesion strength can be achieved.

When the adhesive layer 2 is formed from a cured product of a resin composition containing a thermosetting resin and (B) reactive resin beads (aspect B), and the reactive resin beads are chemically bonded to the thermosetting resin in the adhesive layer, the moldability of the battery packaging material can be improved while the adhesive strength of the adhesive layer is maintained.

Further, when the resin composition having a specific composition is used for formation of the adhesive layer 2, and a light-absorbing and heat-generating substance is incorporated in at least one of the layers in the laminate (aspect C), the adhesive layer 2 having excellent adhesion strength can be quickly formed using a simple method in which the laminate is heated while it is irradiated with light having a wavelength at which the light-absorbing and heat-generating substance can generate heat.

(Thermosetting Resin)

The resin composition to be used for formation of the adhesive layer 2 contains a thermosetting resin. The thermosetting resin is not limited as long as it is polymerized when heated to form a high-molecular network structure, and cured. Specific examples of the thermosetting resin to be used for formation of the adhesive layer 2 include epoxy resins, amino resins (melamine resins, benzoguanamine resins and the like), acrylic resins, urethane resins, phenol resins, unsaturated polyester resins and alkyd resins.

These thermosetting resins may be used alone, or may be used in combination of two or more thereof.

Among these thermosetting resins, urethane resins and epoxy resins are preferred, and two-pack type curable urethane resins and two-pack type curable epoxy resins are further preferred, with two-pack type curable urethane resins being especially preferred for further reduction of the curing time of the adhesive layer 2, further improvement of moldability and so on.

Specific examples of the two-pack type curable urethane resin include combinations of a polyol compound (main agent) and an isocyanate-based compound (curing agent), and specific examples of the two-pack type curable epoxy resin include combinations of an epoxy resin (main agent) and an acid anhydride, an amine compound or an amino resin (curing agent).

The polyol compound to be used as a main agent in the two-pack type curable urethane resin is not particularly limited, and examples thereof include polyester polyols, polyester polyurethane polyols, polyether polyols and polyether polyurethane polyols. These polyol compounds may be used alone, or may be used in combination of two or more thereof.

The isocyanate-based compound to be used as a curing agent in the two-pack type curable urethane resin is not particularly limited, and examples thereof include polyisocyanates, adducts thereof, isocyanurate-modified products thereof, carbodiimide-modified products thereof, allophanate-modified products thereof, and biuret-modified products thereof. Specific examples of the polyisocyanate include aromatic diisocyanates such as diphenylmethane diisocyanate (MDI), polyphenylmethane diisocyanate (polymeric MDI), toluene diisocyanate (TDI), hexamethylene diisocyanate (HDI), bis(4-isocyanatecyclohexyl)methane (H12MDI), isophorone diisocyanate (IPDI), 1,5-naphthalene diisocyanate (1,5-NDI), 3,3'-dimethyl-4,4'-diphenylene diisocyanate (TODI) and xylene diisocyanate (XDI); aliphatic diisocyanates such as tetramethylene diisocyanate, hexamethylene diisocyanate, trimethylhexamethylene diisocyanate and isophorone diisocyanate; and cycloaliphatic diisocyanates such as 4,4'-methylene-bis(cyclohexylisocyanate) and isophorone diisocyanate. Specific examples of the adduct include those obtained by adding trimethylolpropane, glycol or the like to the polyisocyanate. These isocyanate-based compounds may be used alone, or may be used in combination of two or more thereof.

(Curing Accelerator)

In aspect A, the resin composition to be used for formation of the adhesive layer 2 contains a curing accelerator as described above. In aspect B and aspect C, the resin composition to be used for formation of the adhesive layer 2 contains a curing accelerator as necessary. When a thermosetting resin and a curing accelerator coexist as described above, the adhesive layer is quickly cured without requiring aging under a high-temperature condition during production, so that the lead time can be reduced.

Here, the "curing accelerator" is a substance that does not form a crosslinked structure by itself, but accelerates a crosslinking reaction of a thermosetting resin, or a substance that acts to accelerate a crosslinking reaction of a thermosetting resin, and may form a crosslinked structure by itself.

The type of the curing accelerator is appropriately selected according to a thermosetting resin to be used, and examples thereof include amidine compounds, carbodiimide compounds, ketimine compounds, hydrazine compounds, sulfonium salts, benzothiazolium salts and tertiary amine compounds.

The amidine compound is not particularly limited, and examples thereof include imidazole compounds, 1,8-diazabicyclo[5.4.0]undec-7-ene (DBU), 1,5-diazabicyclo[4.3.0]non-5-ene (DBN) and guanidine compounds. Specific examples of the imidazole compound include 2-methylimidazole, 2-ethylimidazole, 2-undecylimidazole, 2,4-dimethylimidazole, 2-heptadecylimidazole, 1,2-dimethylimidazole, 1,2-diethylimidazole, 2-ethyl-4-methylimidazole, 2-phenylimidazole, 1-benzyl-2-phenylimidazole, 1-cyanoethyl-2-methylimidazole, 1-cyanoethyl-2-undecylimidazole, 1-benzyl-2-methylimidazole, 2,4-diamino-6-[2'-methylimidazolyl-(1)]-ethyl-S-triazine, 2,4-diamino-6-[2'-ethyl-4'-methylimidazolyl-(1)]-ethyl-S-triazine, 2,4-diamino-6-[2'-undecylimidazolyl]-ethyl-S-triazine, 2,4-diamino-6-[2'-methylimidazolyl-(1)]-ethyl-S-triazineisocyanuric acid adducts, 2-phenyl-4-methyl-5-hydroxymethylimidazole, 2-phenyl-4,5-dihydroxymethylimidazole and 2-aryl-4,5-diphenylimidazole. These amidine compounds may be used alone, or may be used in combination of two or more thereof.

The carbodiimide compound is not particularly limited, and examples thereof include N,N'-dicyclohexylcarbodiimide, N,N'-diisopropylcarbodiimide, 1-ethyl-3-(3-dimethylaminopropyl)carbodiimide, N-[3-(dimethylamino)propyl]-N'-ethylcarbodiimide, N-[3-(dimethylamino)propyl]-N'-ethylcarbodiimide methiodide, N-tert-butyl-N'-ethylcarbodiimide, N-cyclohexyl-N'-(2-morpholinoethyl)carbodiimide meso-p-toluenesulfonate, N,N'-di-tert-butylcarbodiimide and N,N'-di-p-tolylcarbodiimide. These carbodiimide compounds may be used alone, or may be used in combination of two or more thereof.

The ketimine compound is not particularly limited as long as it has a ketimine bond (N=C), and examples thereof include ketimine compounds obtained by reacting a ketone with an amine. Specific examples of the ketone include methyl ethyl ketone, methyl isopropyl ketone, methyl tertiary butyl ketone, methyl cyclohexyl ketone, diethyl ketone, ethyl propyl ketone, ethyl butyl ketone, dipropyl ketone, dibutyl ketone and diisobutyl ketone. Specific examples of the amine include aromatic polyamines such as o-phenylenediamine, m-phenylenediamine, p-phenylenediamine, m-xylylenediamine, diaminodiphenylmethane, diaminodiphenylsulfone and diaminodiethyldiphenylmethane; aliphatic polyamines such as ethylenediamine, propylenediamine, butylenediamine, diethylenetriamine, triethylenetetramine, tetraethylenepentamine, pentaethylenehexamine, hexamethylenediamine, trimethylhexamethylenediamine, 1,2-propanediamine, iminobispropylamine and methyliminobispropylamine; monoamines having an ether bond on the main chain and diamines having a polyether backbone, such as N-aminoethylpiperazine and 3-butoxyisopropylamine; cycloaliphatic polyamines such as isophoronediamine, 1,3-bisaminomethylcyclohexane, 1-cyclohexylamino-3-aminopropane, and 3-aminomethyl-3,3,5-trimethylcyclohexylamine; diamines having a norbornane backbone; polyamideamines having an amino group at the molecular end of a polyamide; and 2,5-dimethyl-2,5-hexamethylenediamine, mencenediamine and 1,4-bis(2-amino-2-methylpropyl)piperazine. These ketimine compounds may be used alone, or may be used in combination of two or more thereof.

The hydrazine compound is not particularly limited, and examples thereof include adipic acid dihydrazide and isophthalic acid dihydrazide. These hydrazine compounds may be used alone, or may be used in combination of two or more thereof.

The sulfonium salt is not particularly limited, and examples thereof include alkylsulfonium salts such as 4-acetophenyldimethylsulfonium hexafluoroantimonate, 4-acetophenyldimethylsulfonium hexafluoroarsenate, dimethyl-4-(benzyloxycarbonyloxy)phenylsulfonium hexafluoroantimonate, dimethyl-4-(benzoyloxy)phenylsulfonium hexafluoroantimonate and dimethyl-4-(benzoyloxy)

phenylsulfonium hexafluoroarsenate; benzylsulfonium salts such as benzyl-4-hydroxyphenylmethylsulfonium hexafluoroantimonate, 4-acetoxyphenylbenzylmethylsulfonium hexafluoroantimonate, benzyl-4-methoxyphenylmethylsulfonium hexafluoroantimonate, benzyl-3-chloro-4-hydroxyphenylmethylsulfonium hexafluoroarsenate and 4-methoxybenzyl-4-hydroxyphenylmethylsulfonium hexafluorophosphate; dibenzylsulfonium salts such as dibenzyl-4-hydroxyphenylsulfonium hexafluoroantimonate, dibenzyl-4-hydroxyphenylsulfonium hexafluorophosphate, dibenzyl-4-methoxyphenylsulfonium hexafluoroantimonate and benzyl-4-methoxybenzyl-4-hydroxyphenylsulfonium hexafluorophosphate; and substituted benzylsulfonium salts such as p-chlorobenzyl-4-hydroxyphenylmethylsulfonium hexafluoroantimonate, p-nitrobenzyl-4-hydroxyphenylmethylsulfonium hexafluoroantimonate, 3,5-dichlorobenzyl-4-hydroxyphenylmethylsulfonium hexafluoroantimonate and o-chlorobenzyl-3-chloro-4-hydroxyphenylmethylsulfonium hexafluoroantimonate. These sulfonium salts may be used alone, or may be used in combination of two or more thereof.

The benzothiazolium salt is not particularly limited, and examples thereof include benzylbenzothiazolium salts such as 3-benzylbenzothiazolium hexafluoroantimonate, 3-benzylbenzothiazolium hexafluorophosphate, 3-benzylbenzothiazolium tetrafluoroborate, 3-(p-methoxybenzyl)benzothiazolium hexafluoroantimonate, 3-benzyl-2-methylthiobenzothiazolium hexafluoroantimonate and 3-benzyl-5-chlorobenzothiazolium hexafluoroantimonate. These benzothiazolium salts may be used alone, or may be used in combination of two or more thereof.

The tertiary amine compound is not particularly limited, and examples thereof include aliphatic tertiary amines such as trimethylamine, triethylamine, tripropylamine, tributylamine, triethylenediamine, 1,4-diazabicyclo[2.2.2]octane, quinuclidine and 3-quinuclidinol; aromatic tertiary amines such as dimethylaniline; and heterocyclic tertiary amines such as isoquinoline, pyridine, collidine and beta-picoline. These tertiary amine compounds may be used alone, or may be used in combination of two or more thereof.

One preferred example of the curing accelerator is one that serves as a thermal acid generator. The thermal acid generator is a substance that serves as a curing accelerator by generating an acid when it is heated. Specific examples of those that can serve as a thermal acid generator among the above-mentioned curing accelerators include sulfonium salts and benzothiazolium salts.

Another preferred example of the curing accelerator is thermally potential one that is activated under a predetermined heating condition (e.g. 80 to 160° C., preferably 100 to 120° C.) to accelerate a crosslinking reaction of a thermosetting resin. Specific examples of thermally potential substances among the above-mentioned curing accelerators include epoxy adducts including an epoxy compound added to an amidine compound, a hydrazine compound, a tertiary amine compound or the like.

Another preferred example of the curing accelerator is hydrolytically potential one that does not serve as a curing agent in a hermetically sealed state, i.e. a moisture shut-off state, but is hydrolyzed to serve as a curing agent under moisture-existing conditions obtained by opening the hermetically sealed state. Specific examples of hydrolytically potential substances among the above-mentioned curing accelerators include epoxy adducts including an epoxy compound added to an amidine compound, a hydrazine compound, a tertiary amine compound or the like.

These curing accelerators may be used alone, or may be used in combination of two or more thereof. Among these curing accelerators, amidine compounds and sulfonium salts are preferred, with amidine compounds being further preferred.

The content of the curing accelerator in the resin composition to be used for formation of the adhesive layer 2 is appropriately determined according to, for example, the type of thermosetting resin and the type of curing accelerator to be used, and for example, the content of the curing accelerator in terms of the total amount is 0.01 to 6 parts by mass, preferably 0.05 to 5 parts by mass, further preferably 0.1 to 2 parts by mass based on 100 parts by mass of the thermosetting resin.

(Elastomer Resin)

In aspect A, the resin composition to be used for formation of the adhesive layer 2 contains an elastomer resin as described above. When an elastomer resin is incorporated as described above, moderate flexibility is imparted to the adhesive layer 2 while shrinkage of the adhesive layer 2 during curing is suppressed, so that excellent moldability can be imparted to the battery packaging material. When a curing accelerator and an elastomer resin coexist together with a thermosetting resin in the resin composition to be used for formation of the adhesive layer 2, adhesion strength between the base material layer 1 and the barrier layer 3 can be increased.

The elastomer resin to be used in the present invention may be one that has a functional group crosslinkable with the thermosetting resin, and is crosslinked with the thermosetting resin when cured, or may be one that does not have such a functional group, and is not crosslinked with the thermosetting resin even when cured.

The type of elastomer resin to be used in the present invention is not particularly limited, and examples thereof include polyolefin-based elastomers such as ethylene-based elastomers containing, as constituent monomers, ethylene and one or more α-olefins having 2 to 20 carbon atoms (excluding ethylene); styrene-based elastomers; polyester-based elastomers; urethane-based elastomers; acrylic elastomers; epoxy-based elastomers such as bisphenol A-type epoxy-based elastomers; polyol-based elastomers such as those of polyester polyols, polyester polyurethane polyols, polyether polyols and polyether polyurethane polyols; and rubber components such as nitrile rubber, fluororubber, acrylic rubber, silicone rubber, chloroprene rubber, isoprene rubber and butadiene rubber. These elastomer resins may be used alone, or may be used in combination of two or more thereof.

Among these elastomer resins, urethane-based elastomers, epoxy-based elastomers and polyol-based elastomers are preferred.

The content of the elastomer resin in the resin composition to be used for formation of the adhesive layer 2 is not particularly limited, and for example, the content of the elastomer resin in terms of the total amount is 3 to 50 parts by mass, preferably 5 to 30 parts by mass, further preferably 10 to 20 parts by mass based on 100 parts by mass of the thermosetting resin.

(Other Additives)

The resin composition to be used for formation of the adhesive layer 2 may contain other additives such as a solvent and a light-absorbing and heat-generating substance as described later as necessary in addition to the above-mentioned components. A colorant may be contained as the other additive. The colorant is not particularly limited, and a known pigment, dye or the like can be used.

(Reactive Resin Beads)

In aspect B, by incorporating reactive resin beads in the resin composition to be used for formation of the adhesive layer 2, reactive resin beads are chemically bonded to the thermosetting resin in the adhesive layer 2, so that moldability can be improved as described above.

The reactive resin beads are resinous particles (filler) having a functional group that is reacted with and chemically bonded to the thermosetting resin.

The type of functional group of the reactive resin beads to be used in the present invention is appropriately determined according to the type of the thermosetting resin, and examples thereof include a hydroxyl group, a carboxyl group, an isocyanate group, a mercapto group, a hydrolyzable silyl group, an epoxy group, a polymerizable vinyl group and a (meth)acryloyl group. The number of functional groups per one reactive resin bead is not particularly limited, but it is preferred that one reactive resin bead has two or more functional groups for ensuring that reactive resin beads are stably retained in the adhesive layer to exhibit excellent moldability. More specifically, in the case of reactive resin beads having hydroxyl groups, the hydroxyl value is, for example, 1 to 100 KOH mg/g, preferably 5 to 80 KOH mg/g. In the case of reactive resin beads having isocyanate groups (—N═C═O), the N═C═O content is 1 to 10% by weight, preferably 3 to 8% by weight. In the case of reactive resin beads having functional groups other than the hydroxyl value and isocyanate groups, the functional group equivalent (a value obtained by dividing the molecular weight of the reactive resin beads by the molecular weight of the functional group) is 100 to 5000, preferably 150 to 3000.

The resin that forms particles of reactive resin beads is not particularly limited, and examples thereof include urethane resins, acrylic resins, urethane acrylic resins and nylon resins. Among them, urethane resins and acrylic resins are preferred.

As reactive resin beads according to the present invention, urethane beads having hydroxyl groups and/or isocyanate groups as functional groups, and acrylic beads having hydroxyl groups and/or isocyanate groups as functional groups are preferred for further improving moldability.

The refractive index of the reactive resin beads is not particularly limited, but it is, for example, 1.3 to 1.8, preferably 1.4 to 1.6 for imparting excellent transparency to the adhesive layer. Here, the refractive index of the reactive resin beads is a value that is measured in accordance with the method B in JIS K7142 "Plastics. Determination of refractive index." As the refractive index of the reactive resin beads is closer to that of the curable resin to be used, it becomes harder to visually recognize the existence of reactive resin beads in the adhesive layer 2, so that further excellent transparency can be imparted to the adhesive layer.

The average particle size of reactive resin beads is not particularly limited, but it is, for example, 0.1 to 10 µm, preferably 0.2 to 5 µm for further improving moldability. The average particle size of reactive resin beads is a value measured using Shimadzu Laser Diffraction-Type Particle-Size-Distribution Measuring Apparatus SALD-2100-WJA1 by a cyclone injection type dry measurement method in which a powder to be measured is injected from a nozzle by means of compressed air, dispersed in the air, and measured.

As these reactive resin beads, for example, Art-pearl C-TH series (hydroxyl group-added urethane beads) and Art-pearl RU to RV series (reactive urethane beads-Block NCO type) (all of which are manufactured by Negami Chemical Industrial Co., Ltd) are commercially available, and these commercial products can also be used.

These kinds of reactive resin beads may be used alone, or may be used in combination of two or more thereof.

The content of the reactive resin beads in the resin composition to be used for formation of the adhesive layer 2 is appropriately determined according to, for example, the type of thermosetting resin and the type of reactive resin beads to be used, and for example, the content of the reactive resin beads in terms of the total amount is 0.05 to 50 parts by mass, preferably 0.1 to 30 parts by mass, further preferably 0.3 to 15 parts by mass based on 100 parts by mass of the thermosetting resin.

When the resin composition that forms the adhesive layer 2 contains reactive resin beads, the resin composition to be used for formation of the adhesive layer 2 may further contain a curing accelerator. When a curing accelerator is incorporated as described above, the adhesive layer 2 is quickly cured without requiring aging under a high-temperature condition during production, so that the lead time can be reduced. The type and the content of the curing accelerator may be the same as described above.

(Light-Absorbing and Heat-Generating Substance)

When a light-absorbing and heat-generating substance is to be incorporated in the adhesive layer 2 in aspect C as described above, the adhesive layer 2 may be formed with the light-absorbing and heat-generating substance contained in the resin composition.

When the light-absorbing and heat-generating substance is to be incorporated in the adhesive layer 2, the content of the light-absorbing and heat-generating substance in the resin composition to be used for formation of the adhesive layer 2 is not particularly limited, and for example, the content of the light-absorbing and heat-generating substance in terms of the total amount is 0.1 to 10 parts by mass, preferably 0.1 to 3 parts by mass based on 100 parts by mass of the thermosetting resin.

Particularly, by incorporating the above-mentioned elastomer resin in the resin composition that forms the adhesive layer 2, moderate flexibility is imparted to the adhesive layer 2 while shrinkage of the adhesive layer 2 during curing is suppressed, so that excellent moldability can be imparted to the battery packaging material.

(Thickness of Adhesive Layer 2)

The thickness of the adhesive layer 2 is, for example, 2 to 50 µm, preferably 3 to 25 µm.

[Barrier Layer 3]

In the battery packaging material according to the present invention, the barrier layer 3 is a layer which is intended to improve the strength of the packaging material, and also functions as a barrier layer for preventing ingress of water vapor, oxygen, light and the like into the battery. Specific examples of the material of the barrier layer 3 include metal foils such as those of aluminum, stainless steel and titanium; and films on which an inorganic compound such as silicon oxide or alumina is vapor-deposited. Among them, metal foils are preferred, and aluminum foils are further preferred. For preventing occurrence of creases and pinholes during production of the battery packaging material, it is preferred to use a soft aluminum foil, for example an annealed aluminum foil (JIS A8021P-O) or (JIS A8079P-O), for the barrier layer 3 in the present invention.

The thickness of the barrier layer 3 is not particularly limited, but for example, it is normally 10 to 200 µm, preferably 20 to 100 µM when a metal foil is used.

When a metal foil is to be used as the barrier layer 3, it is preferred that at least one surface, preferably at least a surface on the sealant layer side, further preferably both surfaces are subjected to a chemical conversion treatment for stabilization of bonding, prevention of dissolution and corrosion, and so on. Here, the chemical conversion treatment is a treatment for forming an acid resistant film on the surface of the barrier layer 3. Examples of the chemical conversion treatment include a chromic acid chromate treatment using a chromic acid compound such as chromium nitrate, chromium fluoride, chromium sulfate, chromium acetate, chromium oxalate, chromium biphosphate, acetylacetate chromate, chromium chloride or chromium potassium sulfate; a phosphoric acid chromate treatment using a phosphoric acid compound such as sodium phosphate, potassium phosphate, ammonium phosphate or polyphosphoric acid; and a chromate treatment using an aminated phenol polymer formed of repeating units represented by the following general formulae (1) to (4).

[Chemical Formula 1]

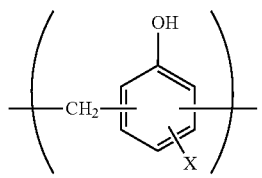

(1)

[Chemical Formula 2]

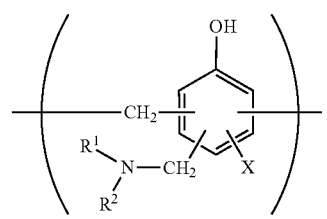

(2)

[Chemical Formula 3]

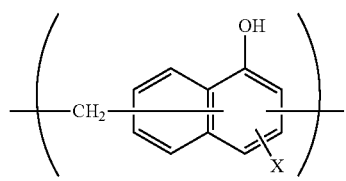

(3)

[Chemical Formula 4]

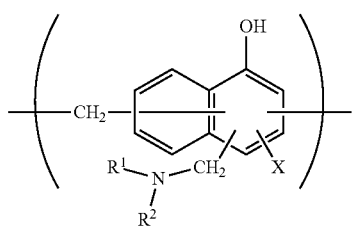

(4)

In the general formulae (1) to (4), X represents a hydrogen atom, a hydroxyl group, an alkyl group, a hydroxyalkyl group, an allyl group or a benzyl group. $R^1$ and $R^2$ are the same or different, and each represent a hydroxyl group, an alkyl group or a hydroxyalkyl group. In the general formulae (1) to (4), examples of the alkyl group represented by X, $R^1$ and $R^2$ include linear or branched alkyl groups having 1 to 4 carbon atoms, such as a methyl group, an ethyl group, an n-propyl group, an isopropyl group, an n-butyl group, an isobutyl group and a tert-butyl group. Examples of the hydroxyalkyl group represented by X, $R^1$ and $R^2$ include linear or branched alkyl groups having 1 to 4 carbon atoms, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group and a 4-hydroxybutyl group. In the general formulae (1) to (4), X is preferably any one of a hydrogen atom, a hydroxyl group, and a hydroxyalkyl group. The number average molecular weight of the aminated phenol polymer formed of repeating units represented by the general formulae (1) to (4) is, for example, about 500 to about 1000000, preferably about 1000 to about 20000.

Examples of the chemical conversion treatment method for imparting corrosion resistance to the metal foil include a method in which the metal foil is coated with a dispersion of fine particles of a metal oxide such as aluminum oxide, titanium oxide, cerium oxide or tin oxide or barium sulfate in phosphoric acid, and annealed at 150° C. or higher to form a corrosion resistance treatment layer on the surface of the metal foil. A resin layer with a cationic polymer crosslinked with a crosslinking agent may be formed on the corrosion resistance treatment layer. Here, examples of the cationic polymer include polyethyleneimine, ion polymer complexes formed of a polymer having polyethyleneimine and a carboxylic acid, primary amine-grafted acrylic resins obtained by grafting a primary amine to an acrylic main backbone, polyallylamine or derivatives thereof, and aminophenol. These cationic polymers may be used alone, or may be used in combination of two or more thereof. Examples of the crosslinking agent include compounds having at least one functional group selected from the group consisting of an isocyanate group, a glycidyl group, a carboxyl group and an oxazoline group, and silane coupling agents. These crosslinking agents may be used alone, or may be used in combination of two or more thereof.

These chemical conversion treatments may be performed alone, or may be performed in combination of two or more thereof. The chemical conversion treatments may be performed using one compound alone, or may be performed using two or more compounds in combination. Among them, a chromic acid chromate treatment is preferred, and a chromate treatment using a chromic acid compound, a phosphoric acid compound and the aminated phenol polymer in combination is further preferred.

The amount of the acid resistant film to be formed on the surface of the metal foil in the chemical conversion treatment is not particularly limited, but for example, when a chromate treatment is performed using a chromic acid compound, a phosphoric acid compound and the aminated phenol polymer in combination, it is desirable that the chromic acid compound be contained in an amount of about 0.5 mg to about 50 mg, preferably about 1.0 mg to about 40 mg, in terms of chromium, the phosphorus compound be contained in an amount of about 0.5 mg to about 50 mg, preferably about 1.0 mg to about 40 mg, in terms of phosphorus, and the aminated phenol polymer be contained in an amount of about 1 mg to about 200 mg, preferably about 5.0 mg to 150 mg, per 1 $m^2$ of the surface of the metal foil.

The chemical conversion treatment is performed in the following manner: a solution containing a compound to be used for formation of an acid resistant film is applied to the surface of the metal foil by a bar coating method, a roll coating method, a gravure coating method, an immersion method or the like, and heating is then performed so that the temperature of the metal foil reaches about 70 to 200° C. The metal foil may be subjected to a degreasing treatment by an alkali immersion method, an electrolytic cleaning method, an acid cleaning method, an electrolytic acid cleaning method or the like before the barrier layer 3 is subjected to a chemical conversion treatment. When a degreasing treatment is performed as described above, the chemical conversion treatment of the surface of the metal foil can be further efficiently performed.

[Second Adhesive Layer 5]

In the battery packaging material according to the present invention, the second adhesive layer 5 is a layer that is provided between the barrier layer 3 and the sealant layer 4 as necessary for strongly bonding the barrier layer 3 and the sealant layer 4 to each other.

The second adhesive layer 5 is formed from an adhesive capable of bonding the barrier layer 3 and the sealant layer 4 to each other. The composition of the adhesive to be used for formation of the second adhesive layer 5 is not particularly limited, but resin compositions as described above in the section of [Adhesive Layer 2] are preferred for, for example, shortening the curing time to reduce the lead time, and further, improving moldability.

When a light-absorbing and heat-generating substance is to be incorporated in the second adhesive layer 5, the light-absorbing and heat-generating substance may be contained in the resin composition to be used for formation of the second adhesive layer 5. The content of the light-absorbing and heat-generating substance in the resin composition to be used for formation of the second adhesive layer 5 is the same as in the case of the resin composition to be used for formation of the adhesive layer 2.

The thickness of the second adhesive layer 5 is, for example, 1 to 40 μm, preferably 2 to 30 μm.

[Sealant Layer 4]

In the battery packaging material according to the present invention, the sealant layer 4 corresponds to the innermost layer, and during construction of a battery, the sealant layers are heat-welded to each other to hermetically seal the battery element.

The resin component to be used in the sealant layer 4 is not particularly limited as long as it can be heat-welded, and examples thereof include polyolefins, cyclic polyolefins, carboxylic acid-modified polyolefins and carboxylic acid-modified cyclic polyolefins.

Specific examples of the polyolefin include polyethylenes such as low-density polyethylene, medium-density polyethylene, high-density polyethylene and linear low-density polyethylene; crystalline or noncrystalline polypropylenes such as homopolypropylene, block copolymers of polypropylenes (e.g. block copolymers of propylene and ethylene) and random copolymers of polypropylenes (e.g. random copolymers of propylene and ethylene); terpolymers of ethylene-butene-propylene; and the like. Among these polyolefins, polyethylenes and polypropylenes are preferred.

The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferred, and norbornene is further preferred.

The carboxylic acid-modified polyolefin is a polymer obtained by modifying the polyolefin with a carboxylic acid. Examples of the carboxylic acid to be used for modification include maleic acid, acrylic acid, itaconic acid, crotonic acid, maleic anhydride and itaconic anhydride.

The carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin. The cyclic polyolefin to be modified with a carboxylic acid is the same as described above. The carboxylic acid to be used for modification is the same as that used for modification of the acid-modified cycloolefin copolymer.

Among these resin components, crystalline or noncrystalline polyolefins, cyclic polyolefins, and blend polymers thereof are preferred, and polyethylenes, polypropylenes, copolymers of ethylene and norbornene, and blend polymers of two or more thereof are further preferred.

The sealant layer 4 may be formed from one resin component alone, or may be formed from a blend polymer obtained by combining two or more resin components. Further, the sealant layer may be formed of only one layer, or may be formed of two or more layers with the same resin component or different resin components.

The thickness of the sealant layer 4 is not particularly limited, but it is 2 to 2000 μm, preferably 5 to 1000 μm, further preferably 10 to 500 μm.

[Insulating Layer 6]

In the battery packaging material according to the present invention, the insulating layer 6 is a layer that is provided on the outside of the base material layer 1 (side opposite to the adhesive layer 2) as necessary for improving insulation quality.

The insulating material to be used for formation of the insulating layer 6 is not particularly limited as long as it has insulation quality and such flexibility as to follow at the time of bending, and examples thereof include organic insulating materials such as fluororesins, polyester resins, epoxy resins, melamine resins, phenol resins, polyurethane resins, silicone resins, polyethylene resins, polyvinyl chloride, acrylic resins and cardo resins; and inorganic insulating materials such as silicon oxide and silicon nitride. These insulating materials may be used alone, or may be used in combination of two or more thereof.

When a light-absorbing and heat-generating substance is to be incorporated in the insulating layer 6, the light-absorbing and heat-generating substance may be mixed with the insulating material to be used for formation of the insulating layer 6. The content of the light-absorbing and heat-generating substance in the insulating layer 6 is not particularly limited, and for example, the content of the light-absorbing and heat-generating substance is 0.1 to 10 parts by mass, preferably 0.1 to 3 parts by mass based on 100 parts by mass of the insulating material contained in the insulating layer 6.

The thickness of the insulating layer 6 is, for example, 0.1 to 10 preferably 0.5 to 4 μm.

For laminating the insulating layer 6 directly, the insulating layer 6 may be laminated on the outside of the base material layer 1 by a method such as a gravure coating method or a roll coating method. When the third adhesive layer 7 is to be provided between the base material layer 1 and the insulating layer 6, the third adhesive layer 7 and the insulating layer 6 may be provided on the outside of the base material layer 1 by a coextrusion lamination method, a heat lamination method, a thermal lamination method, a sandwich lamination method or the like.

[Third Adhesive Layer 7]

In the battery packaging material according to the present invention, the third adhesive layer 7 is a layer that is provided between the base material layer 1 and the insulating layer 6 as necessary for improving adhesion between the layers.

The third adhesive layer 7 is formed from a resin composition capable of bonding the base material layer 1 and the insulating layer 6 to each other. The composition of the resin composition to be used for formation of the third adhesive layer 7 is the same as in the case of the resin composition to be used for formation of the second adhesive layer 5.

When a light-absorbing and heat-generating substance is to be incorporated in the third adhesive layer 7, the light-absorbing and heat-generating substance may be contained in the resin composition to be used for formation of the third adhesive layer 7. The content of the light-absorbing and heat-generating substance in the resin composition to be used for formation of the third adhesive layer 7 is the same as in the case of the resin composition to be used for formation of the adhesive layer 2.

The thickness of the third adhesive layer 7 is the same as in the case of the second adhesive layer 5.

The third adhesive layer 7 can be laminated by a coating method such as a gravure coating method or a roll coating method.

[Coating Layer 8]

In the battery packaging material according to the present invention, the coating layer 8 is a layer that is provided as necessary for the purpose of imparting functionalities such as chemical resistance, slip properties and scratch resistance. The coating layer 8 is provided on the outside of the base material layer 1 (side opposite to the adhesive layer 2), or, when the insulating layer 6 is provided, on the outside of the insulating layer 6 (side opposite to the base material layer 1).

The coating layer 8 is formed from a cured product of a resin composition containing a curable resin. The resin composition to be used for formation of the coating layer 8 is, for example, a resin composition containing a thermosetting resin, further preferably a resin composition containing a thermosetting resin and a curing accelerator. The type and the content of each of the thermosetting resin and the curing accelerator contained in the resin composition are the same as in the case of the resin composition to be used for formation of the adhesive layer 2.

The coating layer 8 may contain additives such as a slipping agent and a matting agent according to functionalities to be imparted. The coating layer 8 may contain a colorant.

The slipping agent is not particularly limited, and examples thereof include those shown as examples for the base material layer 1. The matting agent is not particularly limited, and examples thereof include those shown as examples for the base material layer 1. The colorant is not particularly limited, and examples thereof include those shown as examples for the adhesive layer 2.

When chemical resistance is to be imparted to the coating layer 8, a chemical resistant coating agent may be used.

When a light-absorbing and heat-generating substance is to be incorporated in the coating layer 8, the light-absorbing and heat-generating substance may be contained in the resin composition to be used for formation of the coating layer 8. The content of the light-absorbing and heat-generating substance in the resin composition to be used for formation of the coating layer 8 is the same as in the case of the resin composition to be used for formation of the adhesive layer 2.

The thickness of the coating layer 8 is, for example, 1 to 10 μm, preferably 2 to 5 μm.

The coating layer 8 can be laminated by a coating method such as a gravure coating method or a roll coating method.

2. Light-Absorbing and Heat-Generating Substance

As described above, at least one of the layers in the battery packaging material according to the present invention may contain a light-absorbing and heat-generating substance (aspect C). By incorporating a light-absorbing and heat-generating substance as described above, a stable and even amount of heat can be supplied to the whole of the resin composition when photoirradiation is performed at the time of heating and quickly curing the resin composition to be used for formation of the adhesive layer 2. Thus, occurrence of variations in cured state is suppressed, so that the adhesive layer 2 having excellent adhesion strength can be formed.

In the battery packaging material according to the present invention, the light-absorbing and heat-generating substance should be contained in at least one of the base material layer 1, the adhesive layer 2, the barrier layer 3, the sealant layer 4, and other layers that are provided as necessary. Specifically, when at least one of the second adhesive layer 5, the insulating layer 6, the third adhesive layer 7 and the coating layer 8 is provided, the light-absorbing and heat-generating substance may be contained in at least one of these layers, or may be contained in at least one of the base material layer 1, the adhesive layer 2, the barrier layer 3 and the sealant layer 4.

For improvement of the adhesion strength of the adhesive layer 2, further reduction of the curing time of the adhesive layer 2, and so on, the layer that contains the light-absorbing and heat-generating substance is preferably at least one of the adhesive layer 2, the second adhesive layer 5 provided as necessary, the insulating layer 6 provided as necessary, the third adhesive layer 7 provided as necessary, and the coating layer 8 provided as necessary; further preferably at least one of the adhesive layer 2, the second adhesive layer 5 provided as necessary, the third adhesive layer 7 provided as necessary, and the coating layer 8 provided as necessary; especially preferably the adhesive layer 2.

In the present invention, the light-absorbing and heat-generating substance is a substance that generates heat by absorbing at least a part of light having a wavelength of about 300 to 2000 nm. The light-absorbing and heat-generating substance to be used in the present invention is not particularly limited, and examples thereof include metal powders, inorganic pigments, carbon and organic dyes.

Examples of the metal powder include metal powders of aluminum, stainless steel, iron, titanium, tungsten, nickel, and alloys thereof. These metal powders may be used alone, or may be used in combination of two or more thereof.

Specific examples of the inorganic pigment include zinc oxide, titanium oxide, barium sulfate, aluminum borate, potassium titanate, iridium oxide, tin oxide and composites thereof. These inorganic pigments have such a characteristic that heat is generated by absorbing far-infrared light, mid-infrared light and near-infrared light. These inorganic pigments may be used alone, or may be used in combination of two or more thereof.

Specific examples of the carbon include carbon black.

Specific examples of the organic dye include methine dyes, cyanine dyes, merocyanine dyes, mercurochrome dyes, xanthene-based dyes, porphyrin-based dyes, phthalocyanine dyes (copper phthalocyanine etc.), azo-based dyes and coumarin-based dyes. These organic dyes may be used alone, or may be used in combination of two or more thereof.

Among these light-absorbing and heat-generating substances, carbon and metal powders are preferred, and carbon black, titanium powders, aluminum powders, iron powders, tungsten powders, stainless steel powders and nickel powders are further preferred, with carbon black being still further preferred.

The average particle size of the light-absorbing and heat-generating substance is not particularly limited, and it is, for example, 1000 nm or less, preferably 10 to 1000 nm. Here, the average particle size of the light-absorbing and heat-generating substance means an average value when particles sizes of 1000 primary particles of the light-absorbing and heat-generating substance are measured using a transmission electron microscope.

In the battery packaging material according to the present invention, the content of the light-absorbing and heat-generating substance may be appropriately determined according to, for example, the type of the light-absorbing and heat-generating substance and the types and the number of layers that contain the light-absorbing and heat-generating substance. For example, the content of the light-absorbing and heat-generating substance per 1 $m^2$ of the battery packaging material according to the present invention is in a range of about 4 to 200

3. Method for Producing Battery Packaging Material

While the method for producing a battery packaging material according to the present invention is not particularly limited as long as a laminate including layers each having a predetermined composition is obtained, and for example the following method is shown as an example.

<Case where Light-Absorbing and Heat-Generating Substance is not Used>

First, a base material layer and a barrier layer are bonded to each other with a resin composition interposed therebetween, the resin composition being used for formation of the adhesive layer 2, and the resin composition is cured by performing heating to form a laminate including the base material layer 1, the adhesive layer 2 and the barrier layer 3 laminated in this order (hereinafter, referred to as a "laminate A" in some cases). Specifically, the laminate A can be formed by a dry lamination method in which using a coating method such as a gravure coating method or a roll coating method, the resin composition to be used for formation of the adhesive layer 2 is applied onto the base material layer 1, or the barrier layer 3, the surface of which is subjected to a chemical conversion treatment as necessary, the resin composition is dried, the barrier layer 3 or the base material layer 1 is then laminated, and the adhesive layer 2 is cured. As conditions for curing the adhesive layer 2, for example, the temperature is 150 to 200° C., preferably 160 to 190° C., and the time is 1 to 60 seconds, preferably 1 to 30 seconds. In the present invention, the adhesive layer 2 can be sufficiently cured only with the above-mentioned curing conditions without requiring aging under a high-temperature condition for curing the adhesive layer 2, and therefore the lead time can be considerably reduced as compared to conventional techniques.

When the resin composition to be used for formation of the adhesive layer 2 contains reactive resin beads, conditions for curing the adhesive layer 2 may be appropriately determined according to the type of thermosetting resin, presence/absence of a curing accelerator, and so on. For example, when a curing accelerator is not contained in the resin composition that forms the adhesive layer 2, the temperature is 25 to 100° C., preferably 30 to 80° C., and the time is 1 to 10 days, preferably 2 to 7 days. When a curing accelerator is contained in the resin composition that forms the adhesive layer 2, the temperature is 90 to 200° C., preferably 100 to 190° C., and the time is 1 to 60 seconds, preferably 1 to 30 seconds. Thus, when the resin composition to be used for formation of the adhesive layer 2 contains reactive resin beads, and moreover a curing accelerator is contained in the resin composition that forms the adhesive layer 2, the adhesive layer 2 can be sufficiently cured only with the above-mentioned curing conditions without requiring aging under a high-temperature condition for curing the adhesive layer 2, and therefore the lead time can be considerably reduced as compared to conventional techniques.

The sealant layer 4 is then laminated on the barrier layer 3 of the laminate A. When the sealant layer 4 is to be laminated directly on the barrier layer 3, a resin component that forms the sealant layer 4 may be applied onto the barrier layer 3 of the laminate A by a method such as a gravure coating method or a roll coating method. Examples of the method for providing the second adhesive layer 5 between the barrier layer 3 and the sealant layer 4 include (1) a method in which the second adhesive layer 5 and the sealant layer 4 are co-extruded to be laminated on the barrier layer 3 of the laminate A (coextrusion lamination method); (2) a method in which a laminate including the second adhesive layer 5 and the sealant layer 4 is formed separately, and laminated on the barrier layer 3 of the laminate A by a heat lamination method; (3) a method in which an adhesive for formation of the second adhesive layer 5 is laminated on the barrier layer 3 of the laminate A by, for example, am extrusion method or a method in which the adhesive is applied by solution coating, dried at a high temperature, and further baked, and the sealant layer 4 formed into a sheet shape beforehand is laminated on the second adhesive layer 5 by a thermal lamination method; and (4) a method in which the laminate A and the sealant layer 4 are bonded to each other with the second adhesive layer 5 interposed therebetween while the melted second adhesive layer 5 is poured between the barrier layer 3 of the laminate A and the sealant layer 4 formed into a sheet shape beforehand (sandwich lamination method).

In the manner described above, a laminate including the base material layer 1, the adhesive layer 2, the barrier layer 3, the surface of which is subjected to a chemical conversion treatment as necessary, the second adhesive layer 5 provided as necessary, and the sealant layer 4 is formed.

In the battery packaging material according to the present invention, the layers that form the laminate may be subjected to a surface activation treatment such as a corona treatment, a blast treatment, an oxidation treatment or an ozone treatment as necessary for improving or stabilizing film formability, lamination processing and final product secondary processing (pouching and embossing molding) suitability, and the like.

<Case where Light-Absorbing and Heat-Generating Substance is Used (Aspect C)>

Also when a light-absorbing and heat-generating substance is used, the method for producing a battery packaging material according to the present invention is not particularly limited as long as a laminate including layers each having a predetermined composition is obtained, and examples thereof include a method including a lamination step of laminating at least the base material layer 1, the adhesive layer 2, the barrier layer 3 and the sealant layer 4 in this order, and the method including in the lamination step the following first step and second step:

first step: forming a laminate including at least the base material layer 1, an uncured adhesive layer 2' and the barrier layer 3 in this order, wherein the uncured adhesive layer 2' is a resin composition containing a thermosetting resin and a curing accelerator, and at least one of the layers included in the laminate contains a light-absorbing and heat-generating substance; and second step: converting the uncured adhesive layer 2' into the adhesive layer 2 by heating the laminate obtained in the first step while irradiating the laminate with light having a wavelength at which the light-absorbing and heat-generating substance can generate heat to cure the thermosetting resin contained in the uncured adhesive layer 2'.

Hereinafter, the method for producing a battery packaging material according to the present invention where a light-absorbing and heat-generating substance is used in each step will be described.

[First Step]

In the first step, a laminate (hereinafter, referred to as a "laminate A" in some cases) is formed, the laminate including the base material layer 1, the uncured adhesive layer 2' and the barrier layer 3 in this order, wherein the uncured adhesive layer 2' is a resin composition containing a thermosetting resin and a curing accelerator, and at least one of the layers included in the laminate contains a light-absorbing and heat-generating substance. Here, the uncured adhesive layer 2' is a layer in which the adhesive layer 2 is not cured, and the uncured adhesive layer 2' is formed of a resin composition containing a curable resin and a curing accelerator.

Specifically, in the first step, the laminate A can be formed by a dry lamination method in which using a coating method such as a gravure coating method or a roll coating method, the resin composition to be used for formation of the adhesive layer 2 is applied onto the base material layer 1, or the barrier layer 3, the surface of which is subjected to a chemical conversion treatment as necessary, the resin composition is dried, and the barrier layer 3 or the base material layer 1 is then laminated.

When a light-absorbing and heat-generating substance is contained in any one of the base material layer 1, the uncured adhesive layer 2' and the barrier layer 3, the laminate A including at least these three layers may be subjected to the second step, or the laminate A in which in addition to these three layers, the sealant layer 4 and other layers laminated as necessary are laminated may be subjected to the second step.

When a light-absorbing and heat-generating substance is not contained in any of the base material layer 1, the uncured adhesive layer 2' and the barrier layer 3, the laminate A in which a layer containing a light-absorbing and heat-generating layer is further laminated on these three layers may be subjected to the second step.

[Second Step]

In the second step, the uncured adhesive layer 2' is converted into the adhesive layer 2 by heating the laminate obtained in the first step while irradiating the laminate with light having a wavelength at which the light-absorbing and heat-generating substance can generate heat to cure the thermosetting resin contained in the uncured adhesive layer 2'.

As photoirradiation conditions for curing the uncured adhesive layer 2', the wavelength and output density of light may be determined so that the light-absorbing and heat-generating substance contained in the laminate obtained in the first step generates heat to such a degree that the curing reaction of the thermosetting resin can proceed, and the photoirradiation conditions are appropriately determined based on the type and heat generation properties of the light-absorbing and heat-generating substance to be used. Specifically, as photoirradiation conditions, the output density of light at which the light-absorbing and heat-generating substance can generate heat is normally 1 to 10 $W \cdot m^{-2}$, preferably 3 to 9 $W \cdot m^{-2}$, further preferably 5 to 8 $W \cdot m^{-2}$.

The wavelength of light to be applied for curing the uncured adhesive layer 2' should be in a range where the light-absorbing and heat-generating substance contained in the laminate obtained in the first step can generate heat by absorbing the light. For example, light having a wavelength including that of mid-infrared light or near-infrared light may be applied when the light-absorbing and heat-generating substance is carbon, and light having a wavelength including that of far-infrared light, mid-infrared light or near-infrared light may be applied when the light-absorbing and heat-generating substance is a metal powder, an inorganic pigment or an organic dye. As photoirradiation for curing the uncured adhesive layer 2, irradiation from a halogen lamp is preferred.

Photoirradiation is performed with a light source set so as to expose the light-absorbing and heat-generating substance to light. For example, when the light-absorbing and heat-generating substance is contained in a layer on the outside with respect to the barrier layer, photoirradiation is performed by applying light from the base material layer 1 side with the light source placed on the base material layer 1 side. When the light-absorbing and heat-generating substance is contained in a layer on the outside with respect to the barrier layer, photoirradiation is performed by applying light from the sealant layer 4 side with the light source placed on the sealant layer 4 side.

For heating conditions for curing the uncured adhesive layer 2', for example, the temperature is 150 to 200° C., preferably 160 to 190° C., and the time is 0.1 to 60 seconds, preferably 1 to 30 seconds.

In aspect C, the adhesive layer 2 having excellent adhesion strength can be formed only with the above-mentioned curing conditions without requiring aging under a high-temperature condition for curing the uncured adhesive layer 2', and therefore the lead time can be considerably reduced as compared to conventional techniques.

When the sealant layer 4 is not laminated on the laminate A subjected to the second step, the battery packaging material according to the present invention is obtained by laminating the sealant layer 4 on the barrier layer 3 of the laminate obtained in the second step. After the second step, a layer to be laminated as necessary may be laminated on the laminate obtained in the second step as necessary.

5. Use of Battery Packaging Material

The battery packaging material according to the present invention is used as a packaging material for hermetically sealing and storing battery elements such as a positive electrode, a negative electrode and an electrolyte.

Specifically, a battery element including at least a positive electrode, a negative electrode and an electrolyte is covered with the battery packaging material according to the present invention such that a flange portion (region where sealant layers are in contact with each other) can be formed on the periphery of the battery element while a metal terminal connected to each of the positive electrode and the negative electrode protrudes to outside, and sealant layers at the flange portion are heat-sealed with each other to hermetically seal the battery element, thereby providing a battery using a battery packaging material. When the battery element is stored using the battery packaging material according to the present invention, the battery packaging material according to the present invention is used such that the sealant portion is on the inner side (surface in contact with the battery element).

The battery packaging material according to the present invention may be used for either a primary battery or a secondary battery, but is preferably used for a secondary battery. The type of secondary battery to which the battery packaging material according to the present invention is applied is not particularly limited, and examples thereof include lithium ion batteries, lithium ion polymer batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Among these secondary batteries, preferred subjects to which the battery packaging material according to the present invention is applied include lithium ion batteries and lithium ion polymer batteries.

EXAMPLES

The present invention will be described in detail below by showing examples and comparative examples. It is to be noted that the present invention is not particularly limited to examples.

Examples 1A to 16A and Comparative Examples 1A to 10A

Aspect A: The Adhesive Layer is a Cured Product of a Resin Composition Containing a Thermosetting Resin, and (A) a Curing Accelerator and an Elastomer Resin

[Production of Battery Packaging Material A]

A barrier layer 3 formed of an aluminum foil (thickness: 40 μm) subjected to a chemical conversion treatment at both surfaces was laminated on a base material layer 1 formed of a biaxially stretched nylon film (thickness: 25 μM) using a dry lamination method. Specifically, each of the resin compositions shown in Tables 1A to 4A was applied to one surface of an aluminum foil in such a manner that the thickness was 4 μm, the base material layer 1 was bonded thereon under pressure and heating, and the resin composition was then cured under the following curing conditions to prepare a laminate of base material layer 1/adhesive layer 2/barrier layer 3.

Curing condition A: at 80° C. for 7 days

Curing condition B: at 160° C. for 30 seconds

Curing condition C: at 190° C. for 30 seconds

The chemical conversion treatment of the aluminum foil used as the barrier layer 3 was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

Carboxylic acid-modified polypropylene (disposed on the barrier layer side; thickness: 23 μm) and homopolypropylene (innermost layer; thickness: 23 μm) were then co-extruded onto the barrier layer 3 of the laminate to laminate on the barrier layer 3 a sealant layer including two layers. Thus, a battery packaging material including a laminate including the base material layer 1, the adhesive layer 2, the barrier layer 3 and the sealant layer 4 (carboxylic acid-modified polypropylene layer/homopolypropylene layer) laminated in this order was obtained.

TABLE 1A

| | Resin composition used for formation of first adhesive layer | | | | | | |
|---|---|---|---|---|---|---|---|
| | Thermosetting resin | | | Curing accelerator | | Elastomer resin | |
| | Main agent | Curing agent | Content (parts by mass) | Type | Content (parts by mass) | Type | Content (parts by mass) |
| Comparative Example 1A | Polyol compound | Isocyanate compound | 100 | — | — | — | — |
| Comparative Example 2A | Polyol compound | Isocyanate compound | 100 | Imidazole compound | 2 | — | — |
| Example 1A | Polyol compound | Isocyanate compound | 100 | Imidazole compound | 2 | NBR | 20 |
| Example 2A | Polyol compound | Isocyanate compound | 100 | Imidazole compound | 2 | Epoxy-based elastomer | 20 |
| Example 3A | Polyol compound | Isocyanate compound | 100 | Imidazole compound | 2 | Urethane elastomer | 20 |
| Comparative Example 3A | Polyol compound | Isocyanate compound | 100 | DBU salt | 2 | — | — |
| Example 4A | Polyol compound | Isocyanate compound | 100 | DBU salt | 2 | NBR | 20 |
| Example 5A | Polyol compound | Isocyanate compound | 100 | DBU salt | 2 | Epoxy-based elastomer | 20 |
| Example 6A | Polyol compound | Isocyanate compound | 100 | DBU salt | 2 | Urethane elastomer | 20 |

Polyol compound: urethane polyol having a molecular weight of 800 to 50000 and a hydroxyl value of less than 40

Isocyanate compound: MDI (diphenylmethane diisocyanate) adduct

Imidazole compound: imidazole compound that accelerates the crosslinking reaction of the thermosetting resin at 80 to 150° C.

DBU salt: octylic acid salt of 1,8-diazabicyclo[5.4.0]undec-7-ene

NBR: nitrile rubber having a molecular weight of 10000 to 60000

Epoxy-based elastomer: bisphenol A-type epoxy resin having a molecular weight of 200 to 1000

Urethane elastomer: urethane elastomer having a molecular weight of 10000 to 60000

TABLE 2A

| | Resin composition used for formation of first adhesive layer ||||||
| | Thermosetting resin ||| Curing accelerator || Elastomer resin ||
| | Main agent | Curing agent | Content (parts by mass) | Type | Content (parts by mass) | Type | Content (parts by mass) |
|---|---|---|---|---|---|---|---|
| Comparative Example 4A | Epoxy resin | Acid anhydride | 100 | — | — | — | — |
| Comparative Example 5A | Epoxy resin | Acid anhydride | 100 | Imidazole compound | 2 | — | — |
| Example 9A | Epoxy resin | Acid anhydride | 100 | Imidazole compound | 2 | Epoxy-based elastomer | 20 |
| Example 7A | Epoxy resin | Acid anhydride | 100 | Imidazole compound | 2 | Polyol-based elastomer | 20 |
| Example 8A | Epoxy resin | Acid anhydride | 100 | Imidazole compound | 2 | NBR | 20 |
| Example 9A | Epoxy resin | Acid anhydride | 100 | Imidazole compound | 2 | Urethane elastomer | 20 |
| Comparative Example 6A | Epoxy resin | Acid anhydride | 100 | DBU salt | 2 | — | — |
| Example 10A | Epoxy resin | Acid anhydride | 100 | DBU salt | 2 | Epoxy-based elastomer | 20 |
| Example 11A | Epoxy resin | Acid anhydride | 100 | DBU salt | 2 | Polyol-based elastomer | 20 |
| Example 12A | Epoxy resin | Acid anhydride | 100 | DBU salt | 2 | NBR | 20 |
| Example 13A | Epoxy resin | Acid anhydride | 100 | DBU salt | 2 | Urethane elastomer | 20 |

Epoxy resin: phenol novolac-type epoxy resin having a molecular weight of 200 to 1000
Acid anhydride: methylhexahydrophthalic anhydride
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Epoxy-based elastomer: bisphenol A-type epoxy resin having a molecular weight of 200 to 1000
Polyol-based elastomer: Polyol-based elastomer having a molecular weight of 8000 to 50000
NBR: nitrile rubber having a molecular weight of 10000 to 60000
Urethane elastomer: urethane elastomer having a molecular weight of 10000 to 60000

TABLE 3A

| | Resin composition used for formation of first adhesive layer ||||||
| | Thermosetting resin ||| Curing accelerator || Elastomer resin ||
| | Main agent | Curing agent | Content (parts by mass) | Type | Content (parts by mass) | Type | Content (parts by mass) |
|---|---|---|---|---|---|---|---|
| Comparative Example 7A | Polyol compound | Amino resin | 100 | Sulfonium salt | 2 | — | — |
| Example 14A | Polyol compound | Amino resin | 100 | Sulfonium salt | 2 | NBR | 20 |
| Example 15A | Polyol compound | Amino resin | 100 | Sulfonium salt | 2 | Epoxy-based elastomer | 20 |
| Example 16A | Polyol compound | Amino resin | 100 | Sulfonium salt | 2 | Urethane elastomer | 20 |
| Comparative Example 8A | Polyol compound | Isocyanate compound | 100 | — | — | — | — |
| Comparative Example 9A | Polyol compound | Isocyanate compound | 100 | Imidazole compound | 2 | — | — |
| Example 17A | Polyol compound | Isocyanate compound | 100 | Imidazole compound | 2 | NBR | 20 |
| Example 18A | Polyol compound | Isocyanate compound | 100 | Imidazole compound | 2 | Epoxy-based elastomer | 20 |
| Example 19A | Polyol compound | Isocyanate compound | 100 | Imidazole compound | 2 | Urethane elastomer | 20 |
| Comparative Example 10A | Polyol compound | Isocyanate compound | 100 | Imidazole compound | 2 | — | — |
| Example 20A | Polyol compound | Isocyanate compound | 100 | Imidazole compound | 2 | NBR | 20 |
| Example 21A | Polyol compound | Isocyanate compound | 100 | Imidazole compound | 2 | Epoxy-based elastomer | 20 |
| Example 22A | Polyol compound | Isocyanate compound | 100 | Imidazole compound | 2 | Urethane elastomer | 20 |

Polyol compound: urethane polyol having a molecular weight of 8000 to 50000 and a hydroxyl value of less than 40
Amino resin: benzoguanamine resin
Isocyanate compound: MDI (diphenylmethane diisocyanate) adduct
Sulfonium salt: sulfonium salt that accelerates the crosslinking reaction of the thermosetting resin at 80° C. to 150° C.
Imidazole compound: imidazole compound that accelerates the crosslinking reaction of the thermosetting resin at 80 to 150° C.
NBR: nitrile rubber having a molecular weight of 10000 to 60000
Epoxy-based elastomer: bisphenol A-type epoxy resin having a molecular weight of 200 to 1000
Urethane elastomer: urethane elastomer having a molecular weight of 10000 to 60000

TABLE 4A

Resin composition used for formation of first adhesive layer

| | Thermosetting resin | | | Curing accelerator | | Elastomer resin | |
|---|---|---|---|---|---|---|---|
| | Main agent | Curing agent | Content (parts by mass) | Type | Content (parts by mass) | Type | Content (parts by mass) |
| Comparative Example 11A | Epoxy resin | Acid anhydride | 100 | — | — | — | — |
| Comparative Example 12A | Epoxy resin | Acid anhydride | 100 | Imidazole compound | 2 | — | — |
| Example 23A | Epoxy resin | Acid anhydride | 100 | Imidazole compound | 2 | Epoxy-based elastomer | 20 |
| Example 24A | Epoxy resin | Acid anhydride | 100 | Imidazole compound | 2 | Polyol-based elastomer | 20 |
| Example 25A | Epoxy resin | Acid anhydride | 100 | Imidazole compound | 2 | NBR | 20 |
| Example 26A | Epoxy resin | Acid anhydride | 100 | Imidazole compound | 2 | Urethane elastomer | 20 |
| Comparative Example 13A | Epoxy resin | Acid anhydride | 100 | DBU salt | 2 | — | — |
| Example 27A | Epoxy resin | Acid anhydride | 100 | DBU salt | 2 | Epoxy-based elastomer | 20 |
| Example 28A | Epoxy resin | Acid anhydride | 100 | DBU salt | 2 | Polyol-based elastomer | 20 |
| Example 29A | Epoxy resin | Acid anhydride | 100 | DBU salt | 2 | NBR | 20 |
| Example 30A | Epoxy resin | Acid anhydride | 100 | DBU salt | 2 | Urethane elastomer | 20 |
| Comparative Example 14A | Polyol compound | Amino resin | 100 | Sulfonium salt | 2 | — | — |
| Example 31A | Polyol compound | Amino resin | 100 | Sulfonium salt | 100 | NBR | 20 |
| Example 32A | Polyol compound | Amino resin | 100 | Sulfonium salt | 100 | Epoxy-based elastomer | 20 |
| Example 33A | Polyol compound | Amino resin | 100 | Sulfonium salt | 100 | Urethane elastomer | 20 |

Epoxy resin: phenol novolac-type epoxy resin having a molecular weight of 200 to 1000
Polyol compound: urethane polyol having a molecular weight of 800 to 50000 and a hydroxyl value of less than 40
Acid anhydride: methylhexahydrophthalic anhydride
Amino resin: benzoguanamine resin
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Epoxy-based elastomer: bisphenol A-type epoxy resin having a molecular weight of 200 to 1000
Polyol-based elastomer: Urethane polyol-based elastomer having a molecular weight of 8000 to 50000
NBR: nitrile rubber having a molecular weight of 10000 to 60000
Urethane elastomer: urethane elastomer having a molecular weight of 10000 to 60000

[Evaluation on Occurrence of Creases]

For each battery packaging material obtained as described above, whether creases occurred or not was visually checked, and the ratio of the number of samples in which creases occurred per 50 battery packaging materials (heat crease defect ratio: %) was calculated.

[Evaluation of Adhesion Strength]

Each battery packaging material obtained as described above was cut to prepare a strip piece of 15 mm×250 mm, the strip piece was delaminated between the base material layer 1 and the barrier layer 3 at a peeling speed of 15 mm/minute using tensile tester (AGS-50D (trade name) manufactured by Shimadzu Corporation), and strength required for delaminating the strip piece was measured to determine adhesion strength (peeling strength) between the base material layer 1 and the barrier layer 3. The adhesion strength was evaluated in accordance with the following assessment criteria.

<Assessment Criteria for Adhesion Strength>
◯: The adhesion strength is not less than 6.0 N/15 mm.
Δ: The adhesion strength is not less than 3.0 N/15 mm and less than 6.0 N/15 mm.
x: The adhesion strength is less than 3.0 N/15 mm.

[Evaluation of Moldability]

Each battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the thermally bondable resin layer was situated on the male mold side, the test sample was pressed at a pressing pressure (surface pressure) of 0.1 MPa with the molding depth set to 6.0 mm and 7.0 mm, and cold molding (draw-in one-step molding) was performed. Presence/absence of pinholes and cracks in each of the molded test samples was checked. Cold molding was performed using 10 battery packaging materials for each of the molding depth of 6.0 mm and the molding depth of 7.0 mm, and moldability was evaluated in accordance with the following assessment criteria.

<Assessment Criteria for Moldability>
⊙: None of the test samples had pinholes and cracks for either the molding depth of 6.0 mm or the molding depth of 7.0 mm.
◯: None of the test samples had pinholes and cracks for the molding depth of 6.0 mm, but one or more of the test samples had pinholes and cracks for the molding depth of 7.0 mm.
x: One or more of the test samples had pinholes and cracks for both the molding depth of 6.0 mm and the molding depth of 7.0 mm.

[Evaluation Results]

The obtained results are shown in Tables 5A to 8A. The results show that by using a resin composition containing a thermosetting resin, a curing accelerator and an elastomer resin for formation of an adhesive layer for bonding a base material layer and a barrier layer, the adhesive layer was quickly cured, occurrence of creases caused by heat was suppressed, and high adhesion strength between the base material layer and the barrier layer, and excellent moldability were achieved (Examples 1A to 33A). On the other hand, when the adhesive layer was formed only from a thermosetting resin, proper adhesion and moldability were obtained, but occurrence of creases caused by heat was observed when the curing time was set long, and occurrence of creases caused by heat was suppressed, but adhesion and moldability were insufficient when the heating temperature was increased to quickly cure the adhesive layer (Comparative Example 1A). When one of the curing accelerator and the elastomer resin was absent in formation of the adhesive layer, not both of adhesion and moldability was satisfied (Comparative Examples 2A to 14A).

It has been confirmed that similar results can be obtained even if main agents and curing agents of thermosetting resins and curing accelerators as used in the above-mentioned examples and comparative examples are replaced by other compounds having the same effects.

TABLE 5A

| | Curing condition | Heat crease defect ratio (%) | Adhesion strength | Moldability |
|---|---|---|---|---|
| Comparative Example 1A | Curing condition A | 20 | ○ | ⊙ |
| Comparative Example 2A | Curing condition B | 0 | X | X |
| Comparative Example 2A | Curing condition B | 0 | Δ | ○ |
| Example 1A | Curing condition B | 0 | ○ | ⊙ |
| Example 2A | Curing condition B | 0 | ○ | ⊙ |
| Example 3A | Curing condition B | 0 | ○ | ⊙ |
| Comparative Example 3A | Curing condition B | 0 | Δ | ○ |
| Example 4A | Curing condition B | 0 | ○ | ⊙ |
| Example 5A | Curing condition B | 0 | ○ | ⊙ |
| Example 6A | Curing condition B | 0 | ○ | ⊙ |

TABLE 6A

| | Curing condition | Heat crease defect ratio (%) | Adhesion strength | Moldability |
|---|---|---|---|---|
| Comparative Example 4A | Curing condition B | 0 | X | X |
| Comparative Example 5A | Curing condition B | 0 | Δ | X |
| Example 9A | Curing condition B | 0 | ○ | ⊙ |
| Example 7A | Curing condition B | 0 | ○ | ⊙ |
| Example 8A | Curing condition B | 0 | ○ | ⊙ |
| Example 9A | Curing condition B | 0 | ○ | ⊙ |
| Comparative Example 6A | Curing condition B | 0 | Δ | X |
| Example 10A | Curing condition B | 0 | ○ | ⊙ |
| Example 11A | Curing condition B | 0 | ○ | ⊙ |
| Example 12A | Curing condition B | 0 | ○ | ⊙ |
| Example 13A | Curing condition B | 0 | ○ | ⊙ |

TABLE 7A

| | Curing condition | Heat crease defect ratio (%) | Adhesion strength | Moldability |
|---|---|---|---|---|
| Comparative Example 7A | Curing condition B | 0 | ○ | X |
| Example 14A | Curing condition B | 0 | ○ | ⊙ |
| Example 15A | Curing condition B | 0 | ○ | ⊙ |
| Example 16A | Curing condition B | 0 | ○ | ⊙ |
| Comparative Example 8A | Curing condition C | 0 | X | X |
| Comparative Example 9A | Curing condition C | 0 | Δ | ○ |
| Example 17A | Curing condition C | 0 | ○ | ⊙ |
| Example 18A | Curing condition C | 0 | ○ | ⊙ |
| Example 19A | Curing condition C | 0 | ○ | ⊙ |
| Comparative Example 10A | Curing condition C | 0 | Δ | ○ |
| Example 20A | Curing condition C | 0 | ○ | ⊙ |
| Example 21A | Curing condition C | 0 | ○ | ⊙ |
| Example 22A | Curing condition C | 0 | ○ | ⊙ |

TABLE 8A

| | Curing condition | Heat crease defect ratio (%) | Adhesion strength | Moldability |
|---|---|---|---|---|
| Comparative Example 11A | Curing condition C | 0 | X | X |
| Comparative Example 12A | Curing condition C | 0 | ○ | X |
| Example 23A | Curing condition C | 0 | ○ | ⊙ |
| Example 24A | Curing condition C | 0 | ○ | ⊙ |
| Example 25A | Curing condition C | 0 | ○ | ⊙ |
| Example 26A | Curing condition C | 0 | ○ | ⊙ |
| Comparative Example 13A | Curing condition C | 0 | ○ | X |
| Example 27A | Curing condition C | 0 | ○ | ⊙ |
| Example 28A | Curing condition C | 0 | ○ | ⊙ |
| Example 29A | Curing condition C | 0 | ○ | ⊙ |
| Example 30A | Curing condition C | 0 | ○ | ⊙ |
| Comparative Example 14A | Curing condition C | 0 | ○ | X |
| Example 31A | Curing condition B | 0 | ○ | ⊙ |
| Example 32A | Curing condition B | 0 | ○ | ⊙ |
| Example 33A | Curing condition B | 0 | ○ | ⊙ |

Examples 1B to 58B and Comparative Examples 1B to 4B

Aspect B: The Adhesive Layer is a Cured Product of a Resin Composition Containing a Thermosetting Resin and (B) Reactive Resin Beads

[Production of Battery Packaging Material 1B]

A barrier layer 3 formed of an aluminum foil (thickness: 40 μm) subjected to a chemical conversion treatment at both surfaces was laminated on a base material layer formed of a biaxially stretched nylon film (thickness: 25 μm) using a dry lamination method. Specifically, a resin composition A having a composition as described below was applied to one surface of an aluminum foil in such a manner that the thickness was 4 μm, a base material layer was bonded thereon under pressure and heating, and the resin composition was then cured at 80° C. for 7 days to prepare a laminate of base material layer/adhesive layer/barrier layer. The chemical conversion treatment of the aluminum foil used as the barrier layer 3 was performed by applying to both the surfaces of the aluminum foil a treatment liquid including a phenol resin, a chromium fluoride compound and phosphoric acid using a roll coating method in such a manner that the application amount of chromium was 10 mg/m² (dry weight), and performing baking for 20 seconds under such conditions that the film temperature was 180° C. or higher.

Carboxylic acid-modified polypropylene (disposed on the barrier layer side; thickness: 23 μm) and homopolypropylene (innermost layer; thickness: 23 μm) were then co-extruded onto the barrier layer of the laminate to laminate on the barrier layer 3 a sealant layer including two layers. Thus, a battery packaging material including a laminate including a base material layer, an adhesive layer, a barrier layer and a sealant layer in this order was obtained.

<Resin Composition a Used for Formation of Adhesive Layer>

Thermosetting resin 100 parts by mass
(main agent: urethane polyol, curing agent: diphenylmethane diisocyanate)
Resin beads predetermined amount shown in Tables 1B to 4B
(resin beads shown in Tables 1B to 4B)

[Production of Battery Packaging Material 2B]

Except that in formation of the adhesive layer, a resin composition B having a composition as described below was used, and the conditions for curing the resin composition were changed to a temperature of 160° C. and a time of 30 seconds, the same method as described in [Production of Battery Packaging Material 1B] was carried out to produce a battery packaging material.

<Resin Composition B Used for Formation of Adhesive Layer>

Thermosetting resin 100 parts by mass
(main agent: urethane polyol, curing agent: diphenylmethane diisocyanate)
Curing accelerator 1 part by mass
(imidazole compound that accelerates the crosslinking reaction of the thermosetting resin at 80 to 150° C.)
Resin beads predetermined amount shown in Tables 1B to 4B
(resin beads shown in Tables 1B to 4B)

[Production of Battery Packaging Material 3B]

Except that in formation of the adhesive layer, a resin composition C having a composition as described below was used, and the conditions for curing the resin composition were changed to a temperature of 160° C. and a time of 30 seconds, the same method as described in [Production of Battery Packaging Material 1B] was carried out to produce a battery packaging material.

<Resin Composition C Used for Formation of Adhesive Layer>

Thermosetting resin 100 parts by mass
(main agent: urethane polyol, curing agent: diphenylmethane diisocyanate)
Curing accelerator 1 part by mass
(octylic acid salt of 1,8-diazabicyclo[5.4.0]undec-7-ene)
Resin beads predetermined amount shown in Tables 1B to 4B
(resin beads shown in Tables 1B to 4B)

[Evaluation of Moldability]

Each battery packaging material obtained as described above was cut to prepare a strip piece of 120×80 mm, and the strip piece was used as a test sample. A straight mold including a rectangular male mold of 30×50 mm, and a female mold with a clearance of 0.5 mm from the male mold was provided, the test sample was placed on the female mold in such a manner that the thermally bondable resin layer was situated on the male mold side, the test sample was pressed at a pressing pressure (surface pressure) of 0.1 MPa with the molding depth set to various values, and cold molding (draw-in one-step molding) was performed. Presence/absence of pinholes and cracks in the metal layer in each of the molded test samples was checked, and the ratio of occurrence (%) of pinholes and cracks was calculated. For the ratio of occurrence of pinholes and cracks, a test sample having at least one pinhole or crack after being molded as described above was discriminated as a molding defective product, and the ratio of molding defective products occurring at the time of molding 100 test samples under the above-mentioned conditions was determined. The test was passed when the ratio of molding defective products was less than 5%, and the test was not passed when the ratio of molding defective products was 5% or more. Evaluation of moldability was similarly performed using as a control a battery packaging material produced in the same manner as described above except that resin beads were not added to the resin composition for forming the adhesive layer. The obtained results were assessed in accordance with the following criteria, and the moldability improvement effect was evaluated.

(Assessment Criteria for Moldability Improvement Effect)

⊙: The molding depth where the test is passed increases by 1.0 mm or more as compared to the control.

○: The molding depth where the test is passed increases by not less than 0.5 mm and less than 1.0 mm as compared to the control.

Δ: The molding depth where the test is passed is the same as that for the control.

x: The molding depth where the test is passed decreases as compared to the control.

[Evaluation Results]

The obtained results are shown in Tables 1B to 4B. As is evident from Tables 1B to 4B, when resin beads having no reactivity were added to the adhesive layer (Comparative Examples 1B to 4B), moldability was reduced as compared to a case where resin beads were not added. On the other hand, it has become apparent that when reactive resin beads are added to the adhesive layer, the molding depth can be increased, so that moldability is improved as compared to a case where resin beads are not added. When a curing accelerator was added to the resin composition for forming the adhesive layer, the adhesive layer was cured in an extremely short time of 30 seconds at 160° C., so that the lead time was considerably reduced (the case of resin compositions B and C).

TABLE 1B

| | Type and added amount of resin beads used | | | | Moldability improvement effect | | |
| --- | --- | --- | --- | --- | --- | --- | --- |
| | | | | | Resin composition used for formation of adhesive layer | | |
| | Constituent resin of beads | Type of functional group | Number of bonded functional groups (hydroxyl value, KOH mg/g) | Average particle size (μm) | Added amount (parts by mass) | Resin composition A | Resin composition B | Resin composition C |
| Comparative Example 1B | Urethane | None | — | 1 | 0.3 | X | X | X |

TABLE 1B-continued

| | Type and added amount of resin beads used | | | | | Moldability improvement effect Resin composition used for formation of adhesive layer | | |
|---|---|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition A | Resin composition B | Resin composition C |
| Comparative Example 2B | Urethane | None | — | 1 | 15 | X | X | X |
| Example 1B | Urethane | Hydroxyl group | 1 | 1 | 0.3 | ○ | ○ | ○ |
| Example 2B | Urethane | Hydroxyl group | 1 | 1 | 15 | ○ | ○ | ○ |
| Example 3B | Urethane | Hydroxyl group | 5 | 0.1 | 0.3 | ○ | ○ | ○ |
| Example 4B | Urethane | Hydroxyl group | 5 | 0.1 | 15 | ○ | ○ | ○ |
| Example 5B | Urethane | Hydroxyl group | 5 | 0.2 | 0.3 | ◎ | ◎ | ◎ |
| Example 6B | Urethane | Hydroxyl group | 5 | 0.2 | 15 | ◎ | ◎ | ◎ |
| Example 7B | Urethane | Hydroxyl group | 5 | 0.2 | 30 | ◎ | ◎ | ◎ |
| Example 8B | Urethane | Hydroxyl group | 5 | 0.2 | 50 | ○ | ○ | ○ |
| Example 9B | Urethane | Hydroxyl group | 5 | 1 | 0.1 | ◎ | ◎ | ◎ |
| Example 10B | Urethane | Hydroxyl group | 5 | 1 | 0.3 | ◎ | ◎ | ◎ |
| Example 11B | Urethane | Hydroxyl group | 5 | 1 | 15 | ◎ | ◎ | ◎ |
| Example 12B | Urethane | Hydroxyl group | 5 | 1 | 30 | ◎ | ◎ | ◎ |
| Example 13B | Urethane | Hydroxyl group | 5 | 1 | 50 | ○ | ○ | ○ |
| Example 14B | Urethane | Hydroxyl group | 5 | 3 | 0.1 | ○ | ○ | ○ |
| Example 15B | Urethane | Hydroxyl group | 5 | 3 | 0.3 | ◎ | ◎ | ◎ |
| Example 16B | Urethane | Hydroxyl group | 5 | 3 | 15 | ◎ | ◎ | ◎ |
| Example 17B | Urethane | Hydroxyl group | 5 | 3 | 30 | ○ | ○ | ○ |
| Example 18B | Urethane | Hydroxyl group | 80 | 1 | 0.3 | ◎ | ◎ | ◎ |
| Example 19B | Urethane | Hydroxyl group | 80 | 1 | 15 | ◎ | ◎ | ◎ |
| Example 20B | Urethane | Hydroxyl group | 100 | 1 | 0.3 | ○ | ○ | ○ |
| Example 21B | Urethane | Hydroxyl group | 100 | 1 | 15 | ○ | ○ | ○ |

All of the resin beads made of urethane resin, which are shown in the table, have a refractive index of 1.5.

TABLE 2B

| | Type and added amount of resin beads used | | | | | Moldability improvement effect Resin composition used for formation of adhesive layer | | |
|---|---|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition A | Resin composition B | Resin composition C |
| Example 22B | Urethane | NCO group | 1 | 1 | 0.3 | ○ | ○ | ○ |
| Example 23B | Urethane | NCO group | 1 | 1 | 15 | ○ | ○ | ○ |
| Example 24B | Urethane | NCO group | 3 | 0.1 | 0.3 | ○ | ○ | ○ |
| Example 25B | Urethane | NCO group | 3 | 0.1 | 15 | ○ | ○ | ○ |
| Example 26B | Urethane | NCO group | 3 | 0.2 | 0.3 | ◎ | ◎ | ◎ |
| Example 27B | Urethane | NCO group | 3 | 0.2 | 15 | ◎ | ◎ | ◎ |
| Example 28B | Urethane | NCO group | 3 | 0.2 | 30 | ◎ | ◎ | ◎ |
| Example 29B | Urethane | NCO group | 3 | 0.2 | 50 | ○ | ○ | ○ |
| Example 30B | Urethane | NCO group | 3 | 1 | 0.1 | ○ | ○ | ○ |
| Example 31B | Urethane | NCO group | 3 | 1 | 0.3 | ◎ | ◎ | ◎ |
| Example 32B | Urethane | NCO group | 3 | 1 | 15 | ◎ | ◎ | ◎ |
| Example 33B | Urethane | NCO group | 3 | 1 | 30 | ◎ | ◎ | ◎ |
| Example 34B | Urethane | NCO group | 3 | 1 | 50 | ○ | ○ | ○ |
| Example 35B | Urethane | NCO group | 3 | 3 | 0.1 | ○ | ○ | ○ |
| Example 36B | Urethane | NCO group | 3 | 3 | 0.3 | ◎ | ◎ | ◎ |
| Example 37B | Urethane | NCO group | 3 | 3 | 15 | ◎ | ◎ | ◎ |
| Example 38B | Urethane | NCO group | 3 | 3 | 30 | ○ | ○ | ○ |
| Example 39B | Urethane | NCO group | 8 | 1 | 0.3 | ◎ | ◎ | ◎ |
| Example 40B | Urethane | NCO group | 8 | 1 | 15 | ◎ | ◎ | ◎ |
| Example 41B | Urethane | NCO group | 10 | 1 | 0.3 | ○ | ○ | ○ |
| Example 42B | Urethane | NCO group | 10 | 1 | 15 | ○ | ○ | ○ |

All of the resin beads made of urethane resin, which are shown in the table, have a refractive index of 1.5.

TABLE 3B

| | Type and added amount of resin beads used | | | | | Moldability improvement effect Resin composition used for formation of adhesive layer | | |
|---|---|---|---|---|---|---|---|---|
| | Constituent resin of beads | Type of functional group | Number of bonded functional groups (hydroxyl value, KOH mg/g) | Average particle size (μm) | Added amount (parts by mass) | Resin composition A | Resin composition B | Resin composition C |
| Comparative Example 3B | Acrylic | None | — | 1 | 0.3 | X | X | X |
| Comparative Example 4B | Acrylic | None | — | 1 | 15 | X | X | X |
| Example 43B | Acrylic | Hydroxyl group | 1 | 1 | 0.3 | ○ | ○ | ○ |
| Example 44B | Acrylic | Hydroxyl group | 1 | 1 | 15 | ○ | ○ | ○ |
| Example 45B | Acrylic | Hydroxyl group | 5 | 1 | 0.3 | ⊙ | ⊙ | ⊙ |
| Example 46B | Acrylic | Hydroxyl group | 5 | 1 | 15 | ⊙ | ⊙ | ⊙ |
| Example 47B | Acrylic | Hydroxyl group | 80 | 1 | 0.3 | ⊙ | ⊙ | ⊙ |
| Example 48B | Acrylic | Hydroxyl group | 80 | 1 | 15 | ⊙ | ⊙ | ⊙ |
| Example 49B | Acrylic | Hydroxyl group | 100 | 1 | 0.3 | ○ | ○ | ○ |
| Example 50B | Acrylic | Hydroxyl group | 100 | 1 | 15 | ○ | ○ | ○ |

All of the resin beads made of acrylic resin, which are shown in the table, have a refractive index of 1.54.

TABLE 4B

| | Type and added amount of resin beads used | | | | | Moldability improvement effect Resin composition used for formation of adhesive layer | | |
|---|---|---|---|---|---|---|---|---|
| | Constituent resin of beads | Type of functional group | Number of bonded functional groups (content of NCO in resin beads, % by weight) | Average particle size (μm) | Added amount (parts by mass) | Resin composition A | Resin composition B | Resin composition C |
| Example 51B | Acrylic | NCO group | 1 | 1 | 0.3 | ○ | ○ | ○ |
| Example 52B | Acrylic | NCO group | 1 | 1 | 15 | ○ | ○ | ○ |
| Example 53B | Acrylic | NCO group | 3 | 1 | 0.3 | ⊙ | ⊙ | ⊙ |
| Example 54B | Acrylic | NCO group | 3 | 1 | 15 | ⊙ | ⊙ | ⊙ |
| Example 55B | Acrylic | NCO group | 8 | 1 | 0.3 | ⊙ | ⊙ | ⊙ |
| Example 56B | Acrylic | NCO group | 8 | 1 | 15 | ⊙ | ⊙ | ⊙ |
| Example 57B | Acrylic | NCO group | 10 | 1 | 0.3 | ○ | ○ | ○ |
| Example 58B | Acrylic | NCO group | 10 | 1 | 15 | ○ | ○ | ○ |

All of the resin beads made of acrylic resin, which are shown in the table, have a refractive index of 1.54.

Examples 1C to 35C and Comparative Examples 1C to 15C

Case where a Light-Absorbing and Heat-Generating Substance is Used

[Production of Battery Packaging Material]

A barrier layer 3 formed of an aluminum foil (thickness: 40 μm) subjected to a chemical conversion treatment at both surfaces was laminated on a base material layer 1 formed of a biaxially stretched nylon film (thickness: 25 μm) using a dry lamination method. Specifically, each of the resin compositions shown in Tables 1C to 4C was applied to one surface of the aluminum foil to form an uncured adhesive layer 2' (thickness: 4 μm) on the barrier layer 3. An adhesive layer 2 on the barrier layer 3 and the base material layer 1 were then bonded to each other under pressure and heating, and a thermosetting resin in the uncured adhesive layer 2' was cured under the following conditions to prepare a laminate of base material layer 1/adhesive layer 2/barrier layer 3.

Curing condition A: at an attainment temperature of 60° C. for 7 days without performing photoirradiation Curing condition B: at an attainment temperature of 190° C. for 1 second while performing photoirradiation with an irradiation output of 7.2 W·cm$^{-2}$ from the base material layer 1 side using a halogen lamp as a light source.

Curing condition C: at an attainment temperature of 140° C. for 1 second while performing photoirradiation with an irradiation output of 4.0 Wan' from the base material layer 1 side using a halogen lamp as a light source.

The chemical conversion treatment of the aluminum foil used as the barrier layer 3 was performed by applying to both the surfaces of the aluminum foil a treatment liquid including a phenol resin, a chromium fluoride compound and phosphoric acid using a roll coating method in such a manner that the application amount of chromium was 10 mg/m$^2$ (dry weight), and performing baking for 20 seconds under such conditions that the film temperature was 180° C. or higher.

Carboxylic acid-modified polypropylene (disposed on the barrier layer side; thickness: 23 μm) and homopolypropylene (innermost layer; thickness: 23 μm) were then co-extruded onto the barrier layer 3 of the laminate to laminate on the barrier layer 3 a sealant layer including two layers. Thus, a battery packaging material including a laminate including the base material layer 1, the adhesive layer 2, the barrier layer 3 and the sealant layer 4 (carboxylic acid-modified polypropylene layer/homopolypropylene layer) laminated in this order was obtained.

TABLE 1C

Resin composition used for formation of first adhesive layer

| | Thermosetting resin | | | Curing accelerator | | Light-Absorbing and Heat-Generating Substance | |
|---|---|---|---|---|---|---|---|
| | Main agent | Curing agent | Content (parts by mass) | Type | Content (parts by mass) | Type | Content (parts by mass) |
| Comparative Example 1C | Polyol compound | Isocyanate compound | 100 | — | — | — | — |
| Comparative Example 2C | Polyol compound | Isocyanate compound | 100 | — | — | Carbon black | 0.5 |
| Example 1C | Polyol compound | Isocyanate compound | 100 | Imidazole compound | 1 | Carbon black | 0.5 |
| Example 2C | Polyol compound | Isocyanate compound | 100 | DBU salt | 1 | Carbon black | 0.5 |
| Comparative Example 3C | Epoxy resin | Acid anhydride | 100 | — | — | Carbon black | 0.5 |
| Example 3C | Epoxy resin | Acid anhydride | 100 | Imidazole compound | 1 | Carbon black | 0.5 |
| Example 4C | Epoxy resin | Acid anhydride | 100 | DBU salt | 1 | Carbon black | 0.5 |
| Example 5C | Polyol compound | Amino resin | 100 | Sulfonium salt | 1 | Carbon black | 0.5 |
| Comparative Example 4C | Polyol compound | Isocyanate compound | 100 | — | — | Titanium powder | 0.5 |
| Example 6C | Polyol compound | Isocyanate compound | 100 | Imidazole compound | 1 | Titanium powder | 0.5 |
| Example 7C | Polyol compound | Isocyanate compound | 100 | DBU salt | 1 | Titanium powder | 0.5 |
| Comparative Example 5C | Epoxy resin | Acid anhydride | 100 | — | — | Titanium powder | 0.5 |
| Example 8C | Epoxy resin | Acid anhydride | 100 | Imidazole compound | 1 | Titanium powder | 0.5 |
| Example 9C | Epoxy resin | Acid anhydride | 100 | DBU salt | 1 | Titanium powder | 0.5 |
| Example 10C | Polyol compound | Amino resin | 100 | Sulfonium salt | 1 | Titanium powder | 0.5 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Amino resin: benzoguanamine resin

TABLE 2C

Resin composition used for formation of first adhesive layer

| | Thermosetting resin | | | Curing accelerator | | Light-Absorbing and Heat-Generating Substance | |
|---|---|---|---|---|---|---|---|
| | Main agent | Curing agent | Content (parts by mass) | Type | Content (parts by mass) | Type | Content (parts by mass) |
| Comparative Example 6C | Polyol compound | Isocyanate compound | 100 | — | — | Aluminum powder | 0.5 |
| Example 11C | Polyol compound | Isocyanate compound | 100 | Imidazole compound | 1 | Aluminum powder | 0.5 |
| Example 12C | Polyol compound | Isocyanate compound | 100 | DBU salt | 1 | Aluminum powder | 0.5 |
| Comparative Example 7C | Epoxy resin | Acid anhydride | 100 | — | — | Aluminum powder | 0.5 |
| Example 13C | Epoxy resin | Acid anhydride | 100 | Imidazole compound | 1 | Aluminum powder | 0.5 |
| Example 14C | Epoxy resin | Acid anhydride | 100 | DBU salt | 1 | Aluminum powder | 0.5 |
| Example 15C | Polyol compound | Amino resin | 100 | Sulfonium salt | 1 | Aluminum powder | 0.5 |
| Comparative Example 8C | Polyol compound | Isocyanate compound | 100 | — | — | Iron powder | 0.5 |
| Example 16C | Polyol compound | Isocyanate compound | 100 | Imidazole compound | 1 | Iron powder | 0.5 |
| Example 17C | Polyol compound | Isocyanate compound | 100 | DBU salt | 1 | Iron powder | 0.5 |
| Comparative Example 9C | Epoxy resin | Acid anhydride | 100 | — | — | Iron powder | 0.5 |
| Example 18C | Epoxy resin | Acid anhydride | 100 | Imidazole compound | 1 | Iron powder | 0.5 |
| Example 19C | Epoxy resin | Acid anhydride | 100 | DBU | 1 | Iron powder | 0.5 |
| Example 20C | Polyol compound | Amino resin | 100 | Sulfonium salt | 1 | Iron powder | 0.5 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Amino resin: benzoguanamine resin

TABLE 3C

Resin composition used for formation of first adhesive layer

| | Thermosetting resin | | | Curing accelerator | | Light-Absorbing and Heat-Generating Substance | |
|---|---|---|---|---|---|---|---|
| | Main agent | Curing agent | Content (parts by mass) | Type | Content (parts by mass) | Type | Content (parts by mass) |
| Comparative Example 10C | Polyol compound | Isocyanate compound | 100 | — | — | Tungsten powder | 0.5 |
| Example 21C | Polyol compound | Isocyanate compound | 100 | Imidazole compound | 1 | Tungsten powder | 0.5 |
| Example 22C | Polyol compound | Isocyanate compound | 100 | DBU salt | 1 | Tungsten powder | 0.5 |
| Comparative Example 11C | Epoxy resin | Acid anhydride | 100 | — | — | Tungsten powder | 0.5 |
| Example 23C | Epoxy resin | Acid anhydride | 100 | Imidazole compound | 1 | Tungsten powder | 0.5 |
| Example 24C | Epoxy resin | Acid anhydride | 100 | DBU salt | 1 | Tungsten powder | 0.5 |
| Example 25C | Polyol compound | Amino resin | 100 | Sulfonium salt | 1 | Tungsten powder | 0.5 |
| Comparative Example 12C | Polyol compound | Isocyanate compound | 100 | — | — | Stainless steel powder | 0.5 |
| Example 26C | Polyol compound | Isocyanate compound | 100 | Imidazole compound | 1 | Stainless steel powder | 0.5 |
| Example 27C | Polyol compound | Isocyanate compound | 100 | DBU salt | 1 | Stainless steel powder | 0.5 |
| Comparative Example 13C | Epoxy resin | Acid anhydride | 100 | — | — | Stainless steel powder | 0.5 |
| Example 28C | Epoxy resin | Acid anhydride | 100 | Imidazole compound | 1 | Stainless steel powder | 0.5 |
| Example 29C | Epoxy resin | Acid anhydride | 100 | DBU salt | 1 | Stainless steel powder | 0.5 |
| Example 30C | Polyol compound | Amino resin | 100 | Sulfonium salt | 1 | Stainless steel powder | 0.5 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Amino resin: benzoguanamine resin

TABLE 4C

Resin composition used for formation of first adhesive layer

| | Thermosetting resin | | | Curing accelerator | | Light-Absorbing and Heat-Generating Substance | |
|---|---|---|---|---|---|---|---|
| | Main agent | Curing agent | Content (parts by mass) | Type | Content (parts by mass) | Type | Content (parts by mass) |
| Comparative Example 14C | Polyol compound | Isocyanate compound | 100 | — | — | Nickel powder | 0.5 |
| Example 31C | Polyol compound | Isocyanate compound | 100 | Imidazole compound | 1 | Nickel powder | 0.5 |
| Example 32C | Polyol compound | Isocyanate compound | 100 | DBU | 1 | Nickel powder | 0.5 |
| Comparative Example 15C | Epoxy resin | Acid anhydride | 100 | — | — | Nickel powder | 0.5 |
| Example 33C | Epoxy resin | Acid anhydride | 100 | Imidazole compound | 1 | Nickel powder | 0.5 |
| Example 34C | Epoxy resin | Acid anhydride | 100 | DBU | 1 | Nickel powder | 0.5 |
| Example 35C | Polyol compound | Amino resin | 100 | Sulfonium salt | 1 | Nickel powder | 0.5 |

Polyol compound: cycloaliphatic polyol having a molecular weight of 500 to 20000 and a hydroxyl value of 50 to 210
Epoxy resin: phenol novolac-type epoxy resin having a molecular weight of 200 to 1000
Isocyanate compound: MDI (diphenylmethane diisocyanate) adduct
Acid anhydride: methylhexahydrophthalic anhydride
Imidazole compound: imidazole compound that accelerates the crosslinking reaction of the thermosetting resin at 80 to 150° C.
DBU salt: octylic acid salt of 1,8-diazabicyclo[5.4.0]undec-7-ene
Sulfonium salt: sulfonium salt that accelerates the crosslinking reaction of the thermosetting resin at 80° C. to 150° C.
Amino resin: benzoguanamine resin

[Evaluation on Occurrence of Creases]

For each battery packaging material obtained as described above, whether creases occurred or not was visually checked, and the ratio of the number of samples in which creases occurred per 50 battery packaging materials (heat crease defect ratio: %) was calculated.

[Evaluation of Adhesion Strength]

Each battery packaging material obtained as described above was cut to a width of 15 mm, and the maximum value of a force required for delaminating the battery packaging material between the base material layer 1 and the barrier layer 3 at a peeling speed of 50 mm/minute was measured to determine adhesion strength (peeling strength) between the base material layer 1 and the barrier layer 3. A sample having an adhesion strength of 6.0 N/15 mm or more was rated ○, and a sample having an adhesion strength of 6.0 N/15 mm was rated x.

[Evaluation Results]

The obtained results are shown in Tables 5C to 8C. The results show that when an adhesive layer for bonding a base material layer and a barrier layer was cured under a photoirradiation condition using a resin composition containing a thermosetting resin, a curing accelerator and a light-absorbing and heat-generating substance, an even cured state was quickly formed, so that occurrence of creases caused by heat was suppressed, and high adhesion strength between the base material layer and the barrier layer was achieved (Examples 1C to 35C). On the other hand, when the adhesive layer was formed only from a thermosetting resin, high adhesion between the base material layer and the barrier layer was achieved, but long-time aging was required for curing the adhesive layer, and occurrence of creases caused by heat was observed (Comparative Example 1C). When the adhesive layer was cured under a photoirradiation condition using a resin composition containing a thermosetting resin and a light-absorbing and heat-generating substance, the battery packaging material was poor in adhesion strength between the base material layer and the barrier layer, and satisfactory adhesion strength was not obtained in quick curing (Comparative Examples 2C to 15C).

It has been confirmed that similar results can be obtained even if main agents and curing agents of thermosetting resins and curing accelerators as used in the above-mentioned examples and comparative examples are replaced by other compounds having the same effects.

TABLE 5C

|  | Curing condition | Heat crease defect ratio (%) | Adhesion strength |
|---|---|---|---|
| Comparative Example 1C | Curing condition A | 20 | ○ |
| Comparative Example 2C | Curing condition B | 0 | X |
|  | Curing condition C | 0 | X |
| Example 1C | Curing condition B | 0 | ○ |
|  | Curing condition C | 0 | ○ |
| Example 2C | Curing condition B | 0 | ○ |
|  | Curing condition C | 0 | ○ |
| Comparative Example 3C | Curing condition B | 0 | X |
|  | Curing condition C | 0 | X |
| Example 3C | Curing condition B | 0 | ○ |
|  | Curing condition C | 0 | ○ |
| Example 4C | Curing condition B | 0 | ○ |
|  | Curing condition C | 0 | ○ |
| Example 5C | Curing condition B | 0 | ○ |
|  | Curing condition C | 0 | ○ |
| Comparative Example 4C | Curing condition B | 0 | X |
|  | Curing condition C | 0 | X |
| Example 6C | Curing condition B | 0 | ○ |
|  | Curing condition C | 0 | ○ |
| Example 7C | Curing condition B | 0 | ○ |
|  | Curing condition C | 0 | ○ |
| Comparative Example 5C | Curing condition B | 0 | X |
|  | Curing condition C | 0 | X |
| Example 8C | Curing condition B | 0 | ○ |
|  | Curing condition C | 0 | ○ |
| Example 9C | Curing condition B | 0 | ○ |
|  | Curing condition C | 0 | ○ |
| Example 10C | Curing condition B | 0 | ○ |
|  | Curing condition C | 0 | ○ |

TABLE 6C

|  | Curing condition | Heat crease defect ratio (%) | Adhesion strength |
|---|---|---|---|
| Comparative Example 6C | Curing condition B | 0 | X |
|  | Curing condition C | 0 | X |

TABLE 6C-continued

|  | Curing condition | Heat crease defect ratio (%) | Adhesion strength |
|---|---|---|---|
| Example 11C | Curing condition B | 0 | ○ |
|  | Curing condition C | 0 | ○ |
| Example 12C | Curing condition B | 0 | ○ |
|  | Curing condition C | 0 | ○ |
| Comparative Example 7C | Curing condition B | 0 | X |
|  | Curing condition C | 0 | X |
| Example 13C | Curing condition B | 0 | ○ |
|  | Curing condition C | 0 | ○ |
| Example 14C | Curing condition B | 0 | ○ |
|  | Curing condition C | 0 | ○ |
| Example 15C | Curing condition B | 0 | ○ |
|  | Curing condition C | 0 | ○ |
| Comparative Example 8C | Curing condition B | 0 | X |
|  | Curing condition C | 0 | X |
| Example 16C | Curing condition B | 0 | ○ |
|  | Curing condition C | 0 | ○ |
| Example 17C | Curing condition B | 0 | ○ |
|  | Curing condition C | 0 | ○ |
| Comparative Example 9C | Curing condition B | 0 | X |
|  | Curing condition C | 0 | X |
| Example 18C | Curing condition B | 0 | ○ |
|  | Curing condition C | 0 | ○ |
| Example 19C | Curing condition B | 0 | ○ |
|  | Curing condition C | 0 | ○ |
| Example 20C | Curing condition B | 0 | ○ |
|  | Curing condition C | 0 | ○ |

TABLE 7C

|  | Curing condition | Heat crease defect ratio (%) | Adhesion strength |
|---|---|---|---|
| Comparative Example 10C | Curing condition B | 0 | X |
|  | Curing condition C | 0 | X |
| Example 21C | Curing condition B | 0 | ○ |
|  | Curing condition C | 0 | ○ |
| Example 22C | Curing condition B | 0 | ○ |
|  | Curing condition C | 0 | ○ |
| Comparative Example 11C | Curing condition B | 0 | X |
|  | Curing condition C | 0 | X |
| Example 23C | Curing condition B | 0 | ○ |
|  | Curing condition C | 0 | ○ |
| Example 24C | Curing condition B | 0 | ○ |
|  | Curing condition C | 0 | ○ |
| Example 25C | Curing condition B | 0 | ○ |
|  | Curing condition C | 0 | ○ |
| Comparative Example 12C | Curing condition B | 0 | X |
|  | Curing condition C | 0 | X |
| Example 26C | Curing condition B | 0 | ○ |
|  | Curing condition C | 0 | ○ |
| Example 27C | Curing condition B | 0 | ○ |
|  | Curing condition C | 0 | ○ |
| Comparative Example 13C | Curing condition B | 0 | X |
|  | Curing condition C | 0 | X |
| Example 28C | Curing condition B | 0 | ○ |
|  | Curing condition C | 0 | ○ |
| Example 29C | Curing condition B | 0 | ○ |
|  | Curing condition C | 0 | ○ |
| Example 30C | Curing condition B | 0 | ○ |
|  | Curing condition C | 0 | ○ |

TABLE 8C

|  | Curing condition | Heat crease defect ratio (%) | Adhesion strength |
|---|---|---|---|
| Comparative Example 14C | Curing condition B | 0 | X |
|  | Curing condition C | 0 | X |

TABLE 8C-continued

| | Curing condition | Heat crease defect ratio (%) | Adhesion strength |
|---|---|---|---|
| Example 31C | Curing condition B | 0 | ○ |
| | Curing condition C | 0 | ○ |
| Example 32C | Curing condition B | 0 | ○ |
| | Curing condition C | 0 | ○ |
| Comparative Example 15C | Curing condition B | 0 | X |
| | Curing condition C | 0 | X |
| Example 33C | Curing condition B | 0 | ○ |
| | Curing condition C | 0 | ○ |
| Example 34C | Curing condition B | 0 | ○ |
| | Curing condition C | 0 | ○ |
| Example 35C | Curing condition B | 0 | ○ |
| | Curing condition C | 0 | ○ |

DESCRIPTION OF REFERENCE SIGNS

1: Base material layer
2: Adhesive layer
3: Barrier layer
4: Sealant layer

The invention claimed is:

1. A battery packaging material which comprises a laminate including at least a base material layer, an adhesive layer, a barrier layer and a sealant layer in this order, wherein the adhesive layer is a cured product of a resin composition containing a thermosetting resin, and at least one of (A) a curing accelerator and an elastomer resin or (B) reactive resin beads.

2. The battery packaging material according to claim 1, wherein the resin composition contains the reactive resin beads and the curing accelerator.

3. The battery packaging material according to claim 1, wherein the resin composition contains the reactive resin beads, and the reactive resin beads are urethane resin beads or acrylic resin beads having a functional group.

4. The battery packaging material according to claim 1, wherein the resin composition contains the reactive resin beads, and the refractive index of the reactive resin beads is 1.3 to 1.8.

5. The battery packaging material according to claim 1, wherein at least one of the layers included in the laminate contains a light-absorbing and heat-generating substance.

6. The battery packaging material according to claim 1, wherein the adhesive layer contains a light-absorbing and heat-generating substance.

7. The battery packaging material according to claim 6, wherein the light-absorbing and heat-generating substance is at least one selected from the group consisting of a metal powder, an inorganic pigment, carbon and an organic dye.

8. The battery packaging material according to claim 6, wherein
the battery packaging material includes a third adhesive layer, an insulating layer and a coating layer in this order from the base material layer side on a side of the base material layer opposite to the adhesive layer, and
at least one layer selected from the group consisting of the coating layer, the insulating layer, the third adhesive layer, the base material layer, the adhesive layer and the sealant layer contains a light-absorbing and heat-generating substance.

9. The battery packaging material according to claim 1, wherein the thermosetting resin is at least one selected from the group consisting of an epoxy resin, an amino resin, an acrylic resin, a urethane resin, a phenol resin, an unsaturated polyester resin and an alkyd resin.

10. The battery packaging material according to claim 1, wherein the resin composition contains the curing accelerator, and the curing accelerator is at least one selected from the group consisting of an amidine compound, a carbodiimide compound, a ketimine compound, a hydrazine compound, a sulfonium salt, a benzothiazolium salt and a tertiary amine compound.

11. The battery packaging material according to claim 1, wherein the barrier layer is a metal foil.

12. The battery packaging material according to claim 1, wherein the resin composition contains the curing accelerator and the elastomer resin.

13. The battery packaging material according to claim 1, wherein the resin composition contains the reactive resin beads.

14. A method for producing a battery packaging material, the method comprising the steps of:
bonding a base material layer and a barrier layer to each other with a resin composition interposed therebetween, the resin composition containing a thermosetting resin, and at least one of (A) a curing accelerator and an elastomer resin or (B) reactive resin beads, and performing heating, thereby curing the resin composition to obtain a laminate including the base material layer, an adhesive layer and the barrier layer in this order; and
laminating a sealant layer on the barrier layer of the laminate obtained in the bonding step.

15. The method according to claim 14, wherein the resin composition contains the curing accelerator and the elastomer resin.

16. The method according to claim 14, wherein the resin composition contains the reactive resin beads.

17. A method for producing a battery packaging material, the method comprising a lamination step of laminating at least a base material layer, an adhesive layer, a barrier layer and a sealant layer in this order, wherein the method comprises in the lamination step the following first step and second step:
the first step of forming a laminate including at least a base material layer, an uncured adhesive layer and a barrier layer in this order, wherein the uncured adhesive layer is a resin composition containing a thermosetting resin, and at least one of (A) a curing accelerator and an elastomer resin or (B) reactive resin beads, and at least one of the layers included in the laminate contains a light-absorbing and heat-generating substance; and
the second step of converting the uncured adhesive layer into an adhesive layer by heating the laminate obtained in the first step while irradiating the laminate with light having a wavelength at which the light-absorbing and heat-generating substance can generate heat, thereby curing the thermosetting resin contained in the uncured adhesive layer.

18. The method according to claim 17, wherein the resin composition contains the curing accelerator and the elastomer resin.

19. The method according to claim 17, wherein the resin composition contains the reactive resin beads.

20. A battery, wherein a battery element including at least a positive electrode, a negative electrode and an electrolyte is stored in the battery packaging material according to claim 1.

* * * * *